United States Patent
Li et al.

(10) Patent No.: US 12,522,677 B2
(45) Date of Patent: Jan. 13, 2026

(54) PROCESSES TO PRODUCE POLY ALPHA-OLEFINS

(71) Applicant: ExxonMobil Chemical Patents Inc., Baytown, TX (US)

(72) Inventors: Mark H. Li, Sugar Land, TX (US); Patrick C. Chen, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 505 days.

(21) Appl. No.: 17/996,971

(22) PCT Filed: Apr. 28, 2021

(86) PCT No.: PCT/US2021/029665
§ 371 (c)(1),
(2) Date: Oct. 24, 2022

(87) PCT Pub. No.: WO2021/222420
PCT Pub. Date: Nov. 4, 2021

(65) Prior Publication Data
US 2023/0167207 A1    Jun. 1, 2023

Related U.S. Application Data

(60) Provisional application No. 63/017,198, filed on Apr. 29, 2020.

(30) Foreign Application Priority Data

Jun. 24, 2020    (EP) .................................... 20182114

(51) Int. Cl.
*C08F 10/14*    (2006.01)
*C08F 4/14*    (2006.01)
*C08F 4/6592*    (2006.01)

(52) U.S. Cl.
CPC ................ *C08F 10/14* (2013.01); *C08F 4/14* (2013.01); *C08F 4/65922* (2013.01)

(58) Field of Classification Search
None
See application file for complete search history.

(56) References Cited

U.S. PATENT DOCUMENTS 3,367,987 A    2/1968    Walsh
4,658,078 A    4/1987    Slaugh et al.
(Continued)

FOREIGN PATENT DOCUMENTS

CN    105622807 A    6/2016
EP    0283739 A2    9/1988
(Continued)

OTHER PUBLICATIONS

Extended European Search Report received for European Patent Application No. 20182114.7 mailed on Nov. 16, 2020, 6 Pages.
(Continued)

*Primary Examiner* — Catherine S Branch

(57) ABSTRACT

The present disclosure relates to processes to produce a poly alpha-olefin (PAO) composition. In some embodiments, a process includes introducing a first C6-C32 alpha-olefin, a second C6-C32 alpha-olefin different than the first C6-C32 alpha-olefin, and a first catalyst system comprising an activator and a metallocene compound into a first reactor, wherein a molar ratio of the first C6-C32 alpha-olefin to the second C6-C32 alpha-olefin is from about 1:5 to about 5:1, by total moles of the first and second C6-C32 alpha-olefin; obtaining a first effluent including a PAO dimer; introducing the first effluent, a third C6-C32 alpha-olefin, and a second catalyst system to an oligomerization unit, wherein the third C6-C32 alpha-olefin is the same or different than the first C6-C32 alpha-olefin and/or second C6-C32 alpha-olefin;
(Continued)

obtaining a second effluent; and hydrogenating the second effluent to form the PAO composition.

22 Claims, 1 Drawing Sheet

(56) References Cited

U.S. PATENT DOCUMENTS

| | | | |
|---|---|---|---|
| 4,973,788 | A | 11/1990 | Lin et al. |
| 5,087,788 | A | 2/1992 | Wu |
| 5,573,657 | A | 11/1996 | Degnan et al. |
| 5,625,105 | A | 4/1997 | Lin et al. |
| 6,403,732 | B2 | 6/2002 | Marks et al. |
| 6,479,722 | B1 | 11/2002 | De et al. |
| 6,548,723 | B2 | 4/2003 | Bagheri et al. |
| 6,548,724 | B2 | 4/2003 | Bagheri et al. |
| 6,818,585 | B2 | 11/2004 | Crowther et al. |
| 7,129,197 | B2 | 10/2006 | Song et al. |
| 7,199,072 | B2 | 4/2007 | Crowther et al. |
| 7,214,745 | B2 | 5/2007 | Arai et al. |
| 8,318,998 | B2 | 11/2012 | Crowther et al. |
| 8,399,724 | B2 | 3/2013 | Crowther et al. |
| 8,426,659 | B2 | 4/2013 | Holtcamp et al. |
| 8,455,416 | B2 | 6/2013 | Bagheri et al. |
| 8,501,894 | B2 | 8/2013 | Crowther et al. |
| 8,623,974 | B2 | 1/2014 | Jiang et al. |
| 8,669,326 | B2 | 3/2014 | Hagadorn et al. |
| 8,669,330 | B2 | 3/2014 | Stewart |
| 8,748,361 | B2 | 6/2014 | Wu et al. |
| 8,754,170 | B2 | 6/2014 | Hagadorn et al. |
| 8,816,027 | B2 | 8/2014 | Crowther et al. |
| 8,835,563 | B2 | 9/2014 | Crowther et al. |
| 8,841,394 | B2 | 9/2014 | Crowther et al. |
| 8,841,397 | B2 | 9/2014 | Holtcamp et al. |
| 8,940,839 | B2 | 1/2015 | Hagadorn et al. |
| 8,981,029 | B2 | 3/2015 | Jiang et al. |
| 9,206,095 | B2 | 12/2015 | Bagheri et al. |
| 9,365,788 | B2 | 6/2016 | Emett et al. |
| 9,688,792 | B2 | 6/2017 | Welle et al. |
| 9,796,645 | B2 | 10/2017 | Emett et al. |
| 2004/0102590 | A1 | 5/2004 | Mccullough et al. |
| 2005/0159299 | A1 | 7/2005 | Rodriguez et al. |
| 2009/0156874 | A1 | 6/2009 | Patil et al. |
| 2009/0240012 | A1 | 9/2009 | Patil et al. |
| 2009/0318644 | A1 | 12/2009 | Brant et al. |
| 2010/0038290 | A1 | 2/2010 | Wang et al. |
| 2010/0170829 | A1 | 7/2010 | Ng et al. |
| 2013/0023633 | A1 | 1/2013 | Holtcamp et al. |
| 2013/0130952 | A1* | 5/2013 | Luo .................. C10M 107/10 508/110 |
| 2013/0303818 | A1 | 11/2013 | Inagaki et al. |
| 2015/0344598 | A1 | 12/2015 | Welle et al. |
| 2017/0233516 | A1 | 8/2017 | Yang et al. |
| 2018/0094088 | A1 | 4/2018 | Crowther et al. |
| 2019/0359744 | A1 | 11/2019 | Chen et al. |
| 2019/0359745 | A1 | 11/2019 | Chen et al. |

FOREIGN PATENT DOCUMENTS

| | | |
|---|---|---|
| EP | 0610851 A1 | 8/1994 |
| EP | 0659756 A1 | 6/1995 |
| JP | 2005-336092 A | 12/2005 |
| JP | 2011-037164 A | 2/2011 |
| KR | 10-17250040000 B1 | 4/2017 |
| WO | 95/27717 A1 | 10/1995 |
| WO | 2009/155471 A2 | 12/2009 |
| WO | 2009/155472 A2 | 12/2009 |
| WO | 2009/155510 A2 | 12/2009 |
| WO | 2009/155517 A2 | 12/2009 |
| WO | 2012/133717 A1 | 10/2012 |
| WO | 2012/134720 A2 | 10/2012 |
| WO | 2017/155149 A1 | 9/2017 |
| WO | 2017/188602 A1 | 11/2017 |
| WO | 2018/094088 A1 | 5/2018 |
| WO | 2018/182982 A2 | 10/2018 |
| WO | 2021/222420 A1 | 11/2021 |

OTHER PUBLICATIONS

U.S. Appl. No. 61/136,172, "Polyalkyl succinic acid derivatives as additives for fouling mitigation in petroleum refinery processes" filed Aug. 15, 2008, 27 Pages.
U.S. Appl. No. 62/477,683, "Metallocene-Catalyzed Polyalpha-Olefins" filed Mar. 28, 2017, 57 Pages.
U.S. Appl. No. 62/477,706, "Metallocene Compounds" filed Mar. 28, 2017, 55 Pages.
Cherian, A. et al., (2005) "Synthesis of Allyl-Terminated Syndiotactic Polypropylene: Macromonomers for the Synthesis of Branched Polyolefins", Macromolecules, vol. 38, No. 15, pp. 6259-6268.
Eshuis, J. et al., (1990) "Catalytic olefin ougomerization and polymerization with cationic group IV metal complexes [Cp2? MMe(THT)]+[BPh4] -, M=Ti, Zr and Hf", Journal of molecular catalysis, vol. 62, No. 3, pp. 277-287.
Janiak, C. et al., (2006) "Metallocene Catalysts for Olefin Oligomerization", Macromolecular symposia, vol. 236, No. 1, pp. 14-22.
Kaneyoshi, H. et al., (2005) "Synthesis of Block and Graft Copolymers with Linear Polyethylene Segments by Combination of Degenerative Transfer Coordination Polymerization and Atom Transfer Radical Polymerization", Macromolecules, vol. 38, No. 13, pp. 5425-5435.
Kolodka, E. et al., (2002) "Copolymerization of Propylene with Poly(ethylene-co-propylene) Macromonomer and Branch Chain-Length Dependence of Rheological Properties", Macromolecules, vol. 35, No. 27, pp. 10062-10070.
Kolodka, E., (2003) "Synthesis and Characterization of Long-Chain-Branched Polyolefins with Metallocene Catalysts: Copolymerization of Ethylene with Poly (ethylene-co-propylene) Macromonomer", Macromolecular rapid communications, vol. 24, No. 4, pp. 311-315.
Markel, E. J. et al., (2000) "Metallocene-Based Branch-Block Thermoplastic Elastomers", Macromolecules, vol. 33, No. 23, pp. 8541-8548.
Moscardi, G. et al., (2001) "Propene Polymerization with the Isospecific, Highly Regioselective rac-Me2C(3-t-Bu-1-Ind) 2ZrCl2/MAO Catalyst. 2. Combined DFT/MM Analysis of Chain Propagation and Chain Release Reactions", Organometallics, vol. 20, No. 10, pp. 1918-1931.
International Preliminary Report on Patentability received for PCT Application No. PCT/US2021/029665, mailed on Nov. 10, 2022, 7 Pages.
International Search Report and Written Opinion received for PCT Application No. PCT/US2021/029665, mailing date Jul. 30, 2021, 9 Pages.
Rose, J. M. et al., (2008) "Poly(ethylene-co-propylene macromonomer)s: Synthesis and Evidence for Starlike Conformations in Dilute Solution", Macromolecules, vol. 41, No. 3, pp. 559-567.
Rulhoff, S. et al., (2006) "Synthesis and Characterization of Defined Branched Poly(propylene)s with Different Microstructures by Copolymerization of Propylene and Linear Ethylene Oligomers (Cn=26-28) with Metallocenes/MAO Catalysts", Macromolecular Chemistry and Physics, vol. 207, No. 16, pp. 1450-1460.
Small, B. L. et al., (1999) "Polymerization of Propylene by a New Generation of Iron Catalysts: Mechanisms of Chain Initiation, Propagation, and Termination", Macromolecules, vol. 32, No. 7, pp. 2120-2130.
Weng, W., (2000) "Synthesis of vinyl-terminated isotactic poly (propylene)", Macromolecular rapid communications, vol. 21, No. 16, pp. 1103-1107.
Yang, X. et al., (1992) "Cationic Metallocene Polymerization Catalysts. Synthesis and Properities of the First Base-Free Zirconocene Hydride", Angewandte Chemie International Edition in English, vol. 31, No. 10, pp. 1375-1377.

* cited by examiner

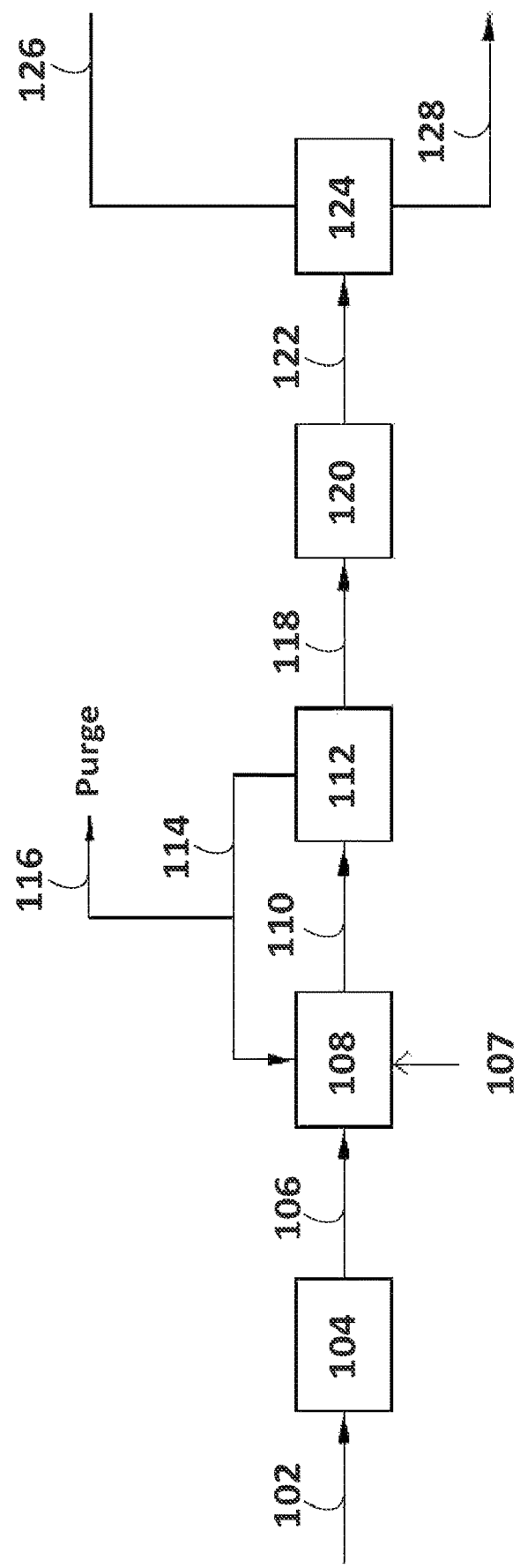

PROCESSES TO PRODUCE POLY ALPHA-OLEFINS

PRIORITY

This application claims priority to and the benefit of U.S. Provisional Application No. 63/017,198, filed Apr. 29, 2020, and European Patent Application No. 20182114.7 which was filed Jun. 24, 2020, the disclosures of which are incorporated herein by reference in their entireties.

FIELD

The present disclosure generally relates to processes to produce poly alpha-olefins using alternative feeds.

BACKGROUND

As society looks to curb carbon emission, equipment builders have accelerated design changes to improve energy efficiency. For example, passenger vehicles have drastically modified the design of their internal combustion engines, trending toward smaller engines that operate at higher (and more efficient) temperatures. There has also been a significant rise in the design of electrified vehicles, and in some designs, equipment builders have eliminated the internal combustion engine in favor of electric vehicles. Similar trends can be observed in industrial equipment design.

Moreover, as a result of the equipment changes mentioned above, lubricant requirements have generally become more stringent. For example, there have been multiple engine oil viscosity grades added to development over the past decade (e.g. 0W-8, 0W-12, 0W-16) in order to meet fuel efficiency requirements established by various emission regulations. These engine oils involve extremely low viscosity base oils without significantly increasing volatility of the lubricant. Low viscosity oils are often associated with low friction properties and improved fuel efficiency. Moreover, the production of low viscosity oils should comply with volatility standards (e.g., upper NOACK volatility limit) and have outstanding oxidative stability. Additionally, electric vehicles have brought new and diverse challenges for driveline fluids and cooling systems, which necessitate tailored lubricant design. One of the challenges for meeting these demands is the cost and production of basestocks used to formulate the lubricants.

Alpha-olefins and poly alpha-olefins (PAOs), are used as intermediates in the manufacture of many commercial products such as lubricant base oil components, basestocks, and surfactants. Decene is commonly used as a linear α-olefin (LAO) feed to produce PAOs, and PAOs produced from decene are typically referred to as the benchmark for PAO performance. For example, when alternative LAOs are used, such as octene or dodecene, basestock performance of the PAO will often worsen. For example, the resulting composition using an alternative LAO will have poor low temperature properties compared to PAOs produced from decene. Consequently, as the demand for PAO increases, the demand for decene has also increased, influencing the price and supply of decene-based LAOs.

There is a considerable market for compositions with PAO having a kinematic viscosity of 4 cSt at 100° C. In order to meet performance requirements, 4 cST PAOs (PAO hybrid trimer) typically use decene as the feedstock for a PAO production process. Conventional methods of forming trimers involve reaction of a PAO dimer feedstock that contains a significant amount of disubstituted vinylene. The disubstituted vinylene, however, is not highly reactive when added to a $BF_3$ catalyzed conventional reactor, and the reaction kinetics are very slow. In addition, the unreacted dimer in the stream going into the $BF_3$-containing conventional reactor contaminates the stream produced from the $BF_3$ process and reduces the value of reactor effluent of the $BF_3$-containing reactor.

Furthermore, conventional plants using decene or other LAO feeds for the production of PAO molecules, such as hybrid trimers, can generate a PAO dimer from a first oligomerization reactor. The PAO dimer product from the first oligomerization reactor is of such poor quality (e.g., there are trimers, tetramers, and higher oligomers) that it is enriched via a separation stage prior to being fed into a second oligomerization reactor. This process involves a separation stage, e.g., a distillation operation, prior to a second oligomerization reactor because feeding the trimer and higher (tetramer+) oligomers to the second oligomerization reactor produces an undesired heavier product from the second oligomerization reaction product. The additional equipment, operators, and downtime involved for the separation stage, for example, can be a burden in terms of cost and efficiencies.

Therefore, there is a need for improved processes for producing PAOs, such as PAO hybrid trimers, from alternative LAO feeds to displace reliance on decene without the need to remove high molecular weight byproducts during the processes. There is further a need for 4 cSt PAO compositions using improved processes that meet the requirements of the 4 cSt PAO market with improved properties over current PAOs.

References for citing in an Information Disclosure Statement (37 C.F.R. 1.97(h)): U.S. application Ser. No. 12/642,453 filed Dec. 18, 2009; Ser. No. 12/533,465 filed Jul. 31, 2009; 61/136,172 filed Aug. 15, 2008; 62/477,683 filed Mar. 28, 2017; 62/477,706 filed Mar. 28, 2017; PCT Publication Nos. WO 95/27717; WO 2009/155471; WO 2009/155472; WO 2009/155510; WO 2009/155517; WO 2012/134720; WO 2012/133717; WO 2017/188602; WO 2017/155149; WO 2018/0094088; WO 2018/182982; U.S. Pat. Nos. 9,796,645; 9,688,792; 9,365,788; 9,206,095; 8,455,416; 7,129,197; 6,548,724; 6,548,723; 6,479,722; 5,625,105; 5,087,788; 4,973,788; 4,658,078; 3,367,987; 7,214,745; 8,816,027; 8,748,361; 8,318,998; 8,669,326; 8,940,839; 8,754,170; 8,426,659; 8,841,397; 8,501,894; 8,669,330; 8,835,563; 8,841,394; 8,399,724; 8,623,974; 8,981,029; 6,403,732; 6,818,585; 7,199,072; US Patent Application Publication Nos. 2018/0094088; 2017/0233516; 2015/0344598; and 2013/0303818; 2013/0023633; 2009/0318644; 2005/0159299; 2004/0102590; Japanese Publication No. JP 2005-336092; JP 2011-037164A; Chinese Publication No. CN 105622807; EP Publication Nos. EP 0 659 756; EP 0 610 851; EP 0 283 739; Korean Publication No. KR 17250040000; Rulhoff, Sascha, is and Kaminsky, "Synthesis and Characterization of Defined Branched Poly (propylene)s with Different Microstructures by Copolymerization of Propylene and Linear Ethylene Oligomers ($C_n$=26-28) with Metallocenes/MAO Catalysts," Macromolecules 16 2006, pp. 1450-1460; Kaneyoshi, Hiromu et al. "Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435; Teuben et al. (*J. Mol. Catal.*, 62, 1990, pp. 277-87); X. Yang et al. (*Angew. Chem., Int'l Edn., Engl.*, 31, 1992, pp. 1375-1377); Small and Brookhart (*Macromol.*, 32, 1999, pp. 2120-2130); Weng et al. (*Macromol Rapid Comm.*, 2000, 21, pp. 1103-1107); *Macromolecules,* 33, 2000, pp. 8541-8548; Moscardi et al. (*Organomet.,* 20, 2001, pp. 1918); Zhu et al. (*Macromol.,* 2002, 35, pp. 10062-10070 and *Macromol. Rap. Commun.,* 2003, 24, pp. 311-315); Coates et al. (*Macromol.,* 2005, 38, pp. 6259-6268); Rose et al. (*Macromolecules,* 2008, 41, pp. 559-567); and Janiak and Blank (*Macromol. Symp.,* 236, 2006, pp. 14-22).

SUMMARY

The present disclosure generally relates to processes to produce poly alpha-olefins using alternative feeds.

In some embodiments, the present disclosure provides a process to produce a poly alpha-olefin (PAO) composition, the process including:

introducing a first $C_6$-$C_{32}$ alpha-olefin, a second $C_6$-$C_{32}$ alpha-olefin different than the first $C_6$-$C_{32}$ alpha-olefin, and a first catalyst system comprising an activator and a metallocene compound into a first reactor under reactor conditions, wherein a molar ratio of the first $C_6$-$C_{32}$ alpha-olefin to the second $C_6$-$C_{32}$ alpha-olefin is from about 1:5 to about 5:1, by total moles of the first and second $C_6$-$C_{32}$ alpha-olefin;

obtaining a first effluent comprising a PAO dimer;

introducing the first effluent, a third $C_6$-$C_{32}$ alpha-olefin, and a second catalyst system to an oligomerization unit, wherein the third $C_6$-$C_{32}$ alpha-olefin is the same or different than the first $C_6$-$C_{32}$ alpha-olefin and/or second $C_6$-$C_{32}$ alpha-olefin;

obtaining a second effluent; and hydrogenating the second effluent to form the PAO composition.

In some embodiments, the present disclosure provides a poly alpha-olefin (PAO) is composition composed of about 85 wt % or greater of a PAO trimer; and about 1 wt % to about 15 wt % of a PAO tetramer and a PAO pentamer, wherein the PAO composition has a kinematic viscosity at 100° C. of from about 3.8 cSt to about 4.3 cSt, according to ASTM D445.

Further areas of applicability will become apparent from the description provided herein. The description and specific examples in this summary are intended for purposes of illustration only and are not intended to limit the scope of the present disclosure.

BRIEF DESCRIPTION OF THE DRAWING

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

The FIGURE is an example apparatus for forming poly alpha-olefins according to at least one embodiment.

To facilitate understanding, identical reference numerals have been used, where possible, to designate identical elements that are common to the FIGURE. It is contemplated that elements and features of one example may be beneficially incorporated in other examples without further recitation.

DETAILED DESCRIPTION

The present disclosure provides processes for producing poly alpha-olefins using alternative feedstocks. Additionally, the present disclosure is directed to a poly alpha-olefin (PAO) composition comprising about 85 wt % or greater of a trimer PAO and at least 1 wt % of a tetramer PAO and a pentamer PAO, wherein the PAO has a kinematic viscosity at 100° C. of from about 3.8 cSt to about 4.3 cSt, according to ASTM D445.

As used herein, a "hybrid trimer," is an example of a PAO molecule which is a reaction m product of a metallocene dimer, such as a PAO dimer, with linear alpha-olefin (LAO) using an acid catalyst system, e.g., $BF_3$-alcohol promoter catalyst system. For example, a hybrid $C_{30}$ trimer is a reaction product of a $C_{20}$ metallocene PAO dimer and $C_{10}$ LAO. For example, a hybrid $C_{31}$ to $C_{32}$ trimer, such as a hybrid $C_{32}$, can be a reaction product of a $C_{22}$ to $C_{23}$ metallocene PAO dimer, such as a $C_{22}$ metallocene PAO dimer, and $C_{10}$ LAO.

For the purposes of this present disclosure, and unless otherwise specified, the term "alkyl" or "alkyl group" interchangeably refers to a saturated hydrocarbyl group consisting of carbon and hydrogen atoms. An alkyl group can be substituted or unsubstituted and can be linear, branched, or cyclic.

For the purposes of this present disclosure, and unless otherwise specified, the term "cycloalkyl" or "cycloalkyl group" interchangeably refers to a saturated hydrocarbyl group wherein the carbon atoms form one or more ring structures.

For the purposes of this present disclosure, and unless otherwise specified, the term "aryl" or "aryl group" interchangeably refers to a hydrocarbyl group comprising an aromatic ring structure therein.

For the purposes of this present disclosure, and unless otherwise specified, a substituted group refers to a group in which at least one atom is replaced by a different atom or a group. Thus, a substituted alkyl group is an alkyl group in which at least one hydrogen atom is replaced by a hydrocarbyl group, a halogen, any other non-hydrogen group, and/or at least one carbon atom and hydrogen atoms bonded thereto is replaced by a different group. As a non-limiting example, a substituted group is a radical in which at least one hydrogen atom has been substituted with a heteroatom or heteroatom containing group, such as with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

For the purposes of this present disclosure, and unless otherwise specified, the term "Cn" group or compound refers to a group or a compound comprising carbon atoms at total number thereof of n. Thus, a "Cm-Cn" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

For the purposes of this present disclosure, and unless otherwise specified, the term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic.

For the purposes of this present disclosure, and unless otherwise specified, the term "alpha-olefin" refers to an olefin having a terminal carbon-to-carbon double bond in the structure thereof ((R'R")—C=CH$_2$, where R' and R" is independently hydrogen or any hydrocarbyl group; such as R' is hydrogen and R" is an alkyl group). A "linear alpha-olefin" is an alpha-olefin defined in this paragraph wherein R' is hydrogen, and R" is hydrogen or a linear alkyl group. Non-limiting examples of α-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The term "vinyl" refers to an olefin having the following formula:

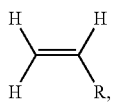

wherein R is a hydrocarbyl group, such as a saturated hydrocarbyl group, such as an alkyl group.

The term "vinylidene" refers to an olefin having the following formula:

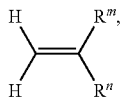

wherein R$^m$ and R$^n$ are each independently a hydrocarbyl group, such as a saturated hydrocarbyl group, such as alkyl group. Vinylidenes are 1,1-disubstituted vinylene groups.

The term "disubstituted vinylene" refers to:
(i) an olefin having the following formula:

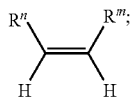

or
(ii) an olefin having the following formula:

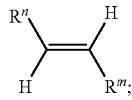

or
(iii) a mixture of (i) and (ii) at any proportion thereof, wherein R$^m$ and R$^n$, the same or different at each occurrence, are each independently a hydrocarbyl group, such as saturated hydrocarbyl group such as alkyl group. Disubstituted vinylenes represent only 1,2-disubstituted vinylene groups and do not include vinylidenes, or 1,1-disubstituted vinylenes. The term "vinylene," as used herein, is an alternative term for "disubstituted vinylene" only and not as a generic class of multiple vinylene species.

The term "trisubstituted vinylene" means an olefin having the following formula:

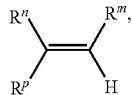

wherein R$^m$, R$^n$, and R$^p$ are each independently a hydrocarbyl group, such as a saturated hydrocarbyl group, such as alkyl group, or alternatively R$^m$ and R$^n$ can together form a non-aryl ring structure with R$^p$ being a pendant hydrocarbyl group.

For the purposes of this present disclosure, and unless otherwise specified, "poly alpha-olefin(s)" (PAO(s)) are polymers of one or more alpha-olefin monomers, such as an oligomer of one or more alpha-olefins. PAOs are polymeric, typically oligomeric, molecules produced from the polymerization/oligomerization reactions of alpha-olefin monomer molecules in the presence of a catalyst system. Thus, the PAO can be a dimer (resulting from two terminal olefin molecules), a trimer (resulting from three terminal olefin molecules), a tetramer (resulting from four terminal olefin molecules), or any other oligomer or polymer comprising two or more structure units derived from one or more terminal olefin monomer(s). The PAOs formed in the present disclosure have a kinematic viscosity (at 100° C.) of from about 3.8 cSt to about 4.3 cSt, according to ASTM D445, or have an Mn of 560 g/mol or less as determined by GC (as described herein), or have a combination thereof. The PAOs of the present disclosure can have a polydispersity index of less than 1.1, such as less than 1.05, such as less than 1.02, such as 1.0092, or 1.0079.

The PAO molecule can be highly regio-regular, such that the bulk material may exhibit an isotacticity, or a syndiotacticity when measured by $^{13}$C NMR. The PAO molecule can be highly regio-irregular, such that the bulk material can be substantially atactic when measured by $^{13}$C NMR. A PAO material made by using a metallocene-based catalyst system is typically called a metallocene-PAO, and a PAO material made by using traditional non-metallocene-based catalysts (e.g., Lewis acids, supported chromium oxide, and the like) is typically called a conventional PAO.

In the present disclosure, any metallocene compound may have one or more optical isomers. All metallocene compounds identified herein by name or structure shall include all possible optical isomers thereof and mixtures of any such optical isomers. For example, metallocene compound Me$_2$Si (Me$_4$Cp)(3-PrInd)ZrMe$_2$ shall include the following two optical isomers and mixtures thereof, even if only one structure is given when it is described:

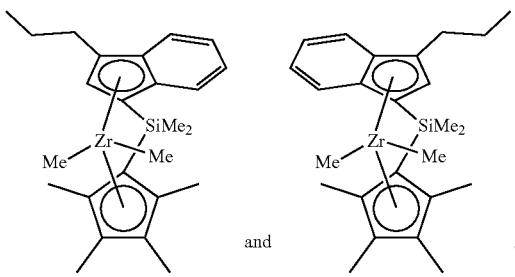

and

For the purposes of this present disclosure, and unless otherwise specified, a "reactor" refers to one or more vessels configured to perform oligomerization processes.

For the purposes of this present disclosure, and unless otherwise specified, a "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluroenyl, indacenyl, benzindenyl, and the like.

For the purposes of this present disclosure, and unless otherwise specified, the terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound is may be used by itself to initiate catalysis or may be used in combination with an activator to initiate catalysis. When the catalyst compound is combined with an activator to initiate catalysis, the catalyst compound is often referred to as a pre-catalyst or catalyst precursor.

A "catalyst system" is a combination of at least one catalyst compound, at least one activator, and optional co-activator, where the system can polymerize/oligomerize monomers to form polymer/oligomer.

For the purposes of this present disclosure, and unless otherwise specified, a scavenger is a compound typically added to facilitate oligomerization/polymerization by scavenging impurities. Some scavengers may also act as activators and may be referred to as co-activators. A co-activator, that is not a scavenger, may be used in conjunction with an activator in order to form an active catalyst. In some embodiments, a co-activator can be pre-mixed with the catalyst compound to form an alkylated catalyst compound.

For the purposes of this present disclosure, and unless otherwise specified, all kinematic viscosity values in the present disclosure are as determined according to ASTM D445. Kinematic viscosity at 100° C. is reported herein as KV100, and kinematic viscosity at 40° C. is reported herein as KV40. Unit of all KV100 and KV40 values herein is cSt, unless otherwise specified.

For the purposes of this present disclosure, and unless otherwise specified, all viscosity index (VI) values in the present disclosure are as determined according to ASTM D2270.

For the purposes of this present disclosure, and unless otherwise specified, all Noack volatility (NV) values in the present disclosure are as determined according to ASTM D5800 and units of all NV values are wt %.

For the purposes of this present disclosure, and unless otherwise specified, rotating pressure vessel oxidation test (RPVOT) values in the present disclosure are determined according to ASTM D2272.

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

For the purposes of this present disclosure, and unless otherwise specified, all percentages of pendant groups, terminal carbon chains, and side chain groups are by mole, unless specified otherwise. Percent by mole is expressed as "mol %," and percent by weight is expressed as "wt %."

For the purposes of this present disclosure, and unless otherwise specified, all molecular weight data are in the unit of g·mol$^{-1}$.

The following abbreviations may be used through this specification: Cp is cyclopentadiene or cyclopentadienyl; Me is methyl, TNOA is tri-n-octylaluminum, and MAO is methylalumoxane.

I. First Oligomerization Process

The present disclosure includes catalyst compounds that can dimerize alpha-olefins, e.g., linear alpha-olefins (such as decene and dodecene), in the presence of metallocene catalysts to produce PAO dimers with high selectivity and high yields, with very low amounts of trimers, tetramers, and higher oligomers (if any), where the higher oligomers are oligomers that have degree of polymerization of 5 or more. As used herein, "degree of polymerization" refers to the number of monomeric units of an oligomer. For example, an oligomer having a degree of polymerization of 3 is an oligomer that is the reaction product of 3 monomers. A "dimer" has a degree of polymerization of 2, and a "trimer" has a degree of polymerization of 3.

In addition, the catalyst compounds can produce, based on the amount of PAO dimers produced, very low disubstituted and trisubstituted vinylene content (e.g., about 0 mol %), very low trisubstituted unsaturation (e.g., about 5 mol % or lower), and very high vinylidene content (e.g., about 95 mol % or higher). The metallocene catalysts, catalyst systems incorporating such, and processes using such, can produce this distribution of dimers with high catalyst efficiency, high product yield, good kinetics as compared to conventional catalysts for dimerizing alpha-olefins.

The metallocene dimer selective reaction is referred to interchangeably as "first oligomerization" or "first oligomerization process."

In some embodiments, the metallocene compound useful in the first oligomerization process for making PAOs is described in U.S. patent application Ser. No. 16/537,364 filed Aug. 9, 2019, incorporated by reference herein.

In some embodiments, the metallocene compound useful in the first oligomerization process for making PAOs can have a structure represented by formula (MC-I):

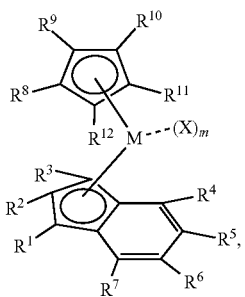

(MC-I)

wherein:
- each of $R^1$, $R^2$, and $R^3$ is independently hydrogen, a substituted or unsubstituted linear, branched, or cyclic $C_1$-$C_{30}$ (such as $C_1$-$C_{20}$, e.g., a $C_1$-$C_8$) hydrocarbyl group;
- each of $R^4$, $R^5$, $R^6$, and $R^7$ is independently hydrogen, a substituted or unsubstituted linear, branched, or cyclic $C_1$-$C_{30}$ (such as a $C_1$-$C_{20}$, e.g., a $C_1$-$C_8$) hydrocarbyl group, or one or more of $R^4$ and $R^5$, $R^5$ and $R^6$, or $R^6$ and $R^7$, taken together with the carbon atoms in the indenyl ring to which they are directly connected, collectively form one or more substituted or unsubstituted rings fused to the indenyl ring;
- each of $R^8$, $R^9$, $R^{10}$, $R^{11}$, and $R^{12}$ is independently a substituted or unsubstituted linear, branched, or cyclic $C_1$-$C_{30}$ (such as $C_1$-$C_{20}$, e.g., a $C_1$-$C_8$) hydrocarbyl, silylcarbyl, or germanyl group;
- M is a transition metal, such as a group 3, 4, or 5 transition metal, such as a group 4 transition metal, such as Hf, Ti, or Zr;
- each X is independently a halogen, a hydride, an amide, an alkoxide, a sulfide, a phosphide, a diene, an amine, a phosphine, an ether, or a $C_1$-$C_{20}$ (e.g., a $C_1$-$C_8$) substituted or unsubstituted linear, branched, or cyclic hydrocarbyl group, or optionally two or more X moieties may together form a fused ring or ring system; and
- m is an integer equal to 1, 2 or 3, such as 2.

In at least one metallocene compound formula herein, each of $R^1$, $R^2$, and $R^3$ can be independently hydrogen or a substituted or unsubstituted linear, branched, or cyclic $C_1$-$C_6$ hydrocarbyl group (e.g., a methyl, an ethyl, a propyl, a butyl, a cyclohexyl, or a phenyl).

In at least one metallocene compound formula herein, each of $R^1$, $R^2$, and $R^3$ can be subject to the proviso that at least one of $R^1$, $R^2$, and $R^3$ is a substituted or unsubstituted linear, branched, or cyclic $C_1$-$C_{20}$, such as $C_1$-$C_8$ hydrocarbyl group, such as $C_1$-$C_6$ hydrocarbyl group (e.g., a methyl, an ethyl, a propyl, a butyl, a cyclohexyl, or a phenyl), and two of $R^1$, $R^2$, and $R^3$ are each hydrogen. In some embodiments, a first one of $R^1$, $R^2$, and $R^3$ is a substituted or unsubstituted linear, branched, or cyclic $C_1$-$C_{20}$ (such as a $C_1$-$C_8$, such as $C_1$-$C_6$ hydrocarbyl group, e.g., a methyl, an ethyl, a propyl, a butyl, a cyclohexyl, or a phenyl) hydrocarbyl group; a second one of $R^1$, $R^2$, and $R^3$ is hydrogen; and a third one of $R^1$, $R^2$, and $R^3$ is hydrogen, a substituted or unsubstituted linear, branched, or cyclic $C_1$-$C_{20}$ (such as a $C_1$-$C_8$, such as $C_1$-$C_6$ hydrocarbyl group, e.g., a methyl, an ethyl, a propyl, a butyl, a cyclohexyl, or a phenyl) hydrocarbyl group.

In at least one metallocene compound formula herein, each of $R^1$ and $R^3$ can be independently a substituted or unsubstituted linear, branched, or cyclic $C_2$-$C_6$ hydrocarbyl group (e.g., an ethyl, a propyl, a butyl, a cyclohexyl, or a phenyl), and $R^2$ can be a hydrogen. In at least one embodiment, each of $R^1$ and $R^3$ can be independently each a methyl group and $R^2$ can be a hydrogen.

In at least one metallocene compound formula herein, each of $R^1$ and $R^3$ can be independently a tertiary or quaternary beta branched ligand in which the alpha and beta atoms are a Group 14 atom, e.g., carbon, silicon, germanium, and two or more, such as three, substituted or unsubstituted linear, branched, or cyclic $C_1$-$C_{18}$, such as $C_1$-$C_8$, hydrocarbyl groups attached to the beta atom. Examples include neopentyl, beta trialkylsilyl-methyl, and beta-trialkylgermanyl-methyl moieties.

In at least one metallocene compound formula herein, examples of $C_1$-$C_{20}$ and/or $C_1$-$C_{30}$ substituted or unsubstituted linear, branched, or cyclic hydrocarbyl groups can include: methyl, ethyl, n-propyl, isopropyl, n-butyl, 1-methylpropyl, 1-ethylethyl, n-pentyl, neopentyl (2,2-methylpropyl), 1-methylpentyl, 1-ethylpropyl, 1-hexyl, 1-methylpentyl, 1-ethylbutyl, 1-propylpropyl, optionally substituted cyclohexyl, optionally substituted phenyl, optionally substituted benzyl, and the like, and any ethylenically unsaturated group that can be derived from them by eliminating one available hydrogen group from each of two adjacent carbon atoms therein.

In at least one metallocene compound formula herein, M can comprise, can consist essentially of, or can be Ti, Zr, and/or Hf. In at least one embodiment, M can comprise, can consist essentially of, or can be Zr and/or Hf, such as Hf. In some embodiments, m can be an integer equal to 1, 2 or 3, such as 2.

In at least one metallocene compound formula herein, each X can be independently a halogen or a substituted or unsubstituted linear, branched, or cyclic $C_1$-$C_6$ hydrocarbyl group, e.g., a methyl, an ethyl, a propyl, a butyl, a phenyl, a benzyl, a chloride, a bromide, or an iodide, such as methyl.

In at least one metallocene compound formula herein, at least three of $R^8$, $R^9$, $R^{10}$, $R^{11}$, and $R^{12}$ are not hydrogen. In some embodiments, at least four of $R^8$, $R^9$, $R^{10}$, $R^{11}$, and $R^{12}$ are each independently a substituted or unsubstituted linear, branched, or cyclic $C_1$-$C_8$ hydrocarbyl group, such as methyl or ethyl.

In at least one metallocene compound formula herein, $R^{12}$ is a substituted or unsubstituted linear, branched, or cyclic $C_1$-$C_8$ hydrocarbyl group, such as methyl or ethyl. In some embodiments, i) at least three of $R^8$, $R^9$, $R^{10}$, $R^{11}$, and $R^{12}$ if present are not hydrogen; ii) two or more of $R^8$, $R^9$, $R^{10}$, and $R^{12}$ if present together form a fused ring or ring system; iii) at least two of $R^4$, $R^5$, $R^6$, and $R^7$ are hydrogen; iv) each X is independently a halogen or a substituted or unsubstituted linear, branched, or cyclic $C_1$-$C_6$ hydrocarbyl group; v) M comprises Zr or Hf; or a combination thereof.

In at least one metallocene compound formula herein, $R^8$, $R^9$, $R^{10}$, and $R^{12}$ are each independently a substituted or unsubstituted linear, branched, or cyclic $C_1$-$C_8$ hydrocarbyl group, such as methyl or ethyl.

In at least one metallocene compound formula herein, the metallocene compound useful in the first oligomerization process for making PAOs can have a structure represented by formula (MC-II):

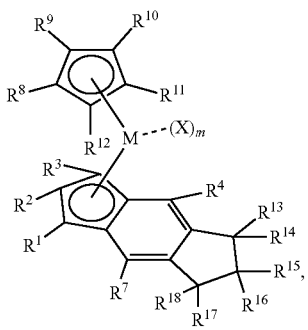

(MC-II)

wherein:
each of $R^{13}$, $R^{14}$, $R^{15}$, $R^{16}$, $R^{17}$, and $R^{18}$ can be independently hydrogen or a substituted or unsubstituted linear, branched, or cyclic $C_1$-$C_{30}$ (such as $C_1$-$C_{20}$, e.g., a $C_1$-$C_8$) hydrocarbyl, silylcarbyl, or germanyl group; and
each of $R^1$, $R^2$, $R^3$, $R^4$, $R^7$, $R^8$, $R^9$, $R^{10}$, $R^{11}$, $R^{12}$, M, m, $C_1$-$C_{30}$, and $C_1$-$C_{20}$ can be as described above.

In some embodiments, a catalyst compound useful for the first oligomerization process can include catalyst I.A, catalyst I.B, catalyst I.C, or a combination thereof:

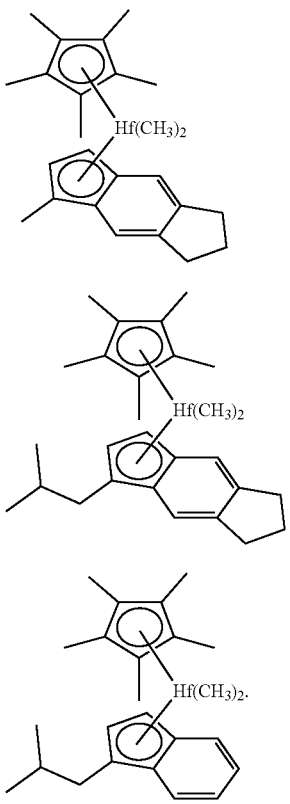

In some embodiments, a catalyst compound useful for the first oligomerization process is can include those suitable oligomerization catalysts described herein.

In at least one embodiment, the catalyst compound can be part of a catalyst system, and such catalyst systems for the first oligomerization can include those suitable oligomerization catalysts described herein.

In at least one embodiment, a process to produce poly alpha-olefin (PAO) includes introducing an alpha-olefin feed and a catalyst system having an activator and a metallocene compound into a reactor under reactor conditions, the feed having at least about 20 wt % of a first $C_6$-$C_{32}$ alpha-olefin, by total weight of the feed, and at least about 20 wt % of a second $C_6$-$C_{32}$ alpha-olefin different than the first $C_6$-$C_{32}$ alpha-olefin, by total weight of the feed and obtaining an effluent having PAO dimer, optional higher oligomers of alpha-olefin, or a combination thereof, the PAO dimer comprising about 90 mol % or more of vinylidene based on total moles of vinylidene, disubstituted vinylene, and trisubstituted vinylene in the product, and the metallocene compound is represented by formula (MC-I) and/or formula (MC-II).

In at least one embodiment, a first oligomerization process for making a poly alpha-olefin (e.g., a dimer of an alpha-olefin) can include introducing two or more alpha-olefins and a catalyst system into a reactor, e.g., a polymerization or oligomerization reactor, under reactor conditions to form a product comprising PAO dimer.

In at least one embodiment, the product produced from the first oligomerization process can include one or more PAO dimer, such as disubstituted vinylene, trisubstituted vinylene, vinylidene, or a combination thereof. In some embodiments, the product produced from the first oligomerization process can include PAO dimers (e.g., vinylidene, disubstituted vinylene, trisubstituted vinylene), trimer of alpha-olefins (PAO trimer), tetramer of alpha-olefins (PAO tetramer), higher oligomers of alpha-olefins (if any), vinyls, unreacted monomers, or a combination thereof. In some embodiments, the unreacted monomers can be removed from the product.

In at least one embodiment, the first oligomerization process can have a selectivity towards vinylidenes at about 80 mol % or more, such as about 85 mol % or more, such as about 88 mol % or more, such as about 90 mol % or more, such as from about 91 mol % to about 100 mol %, such as from about 92 mol % to about 99 mol %, such as from about 93 mol % to about 98 mol %, such as about 93 mol %, about 94 mol %, about 95 mol %, or about 96 mol %, based on a moles of vinyls, vinylidenes, disubstituted vinylenes, and trisubstituted vinylenes in the first reactor effluent. In at least one embodiment, the first oligomerization process can have a selectivity towards products other than vinylidene (e.g., trisubstituted vinylene, disubstituted vinylene, vinyls, PAO trimer, PAO tetramer, higher oligomers, or a combination thereof) of about 20 mol % or less, such as about 15 mol % or less, such as about 12 mol % or less, such as about 10 mol % or less, such as from about 0 mol % to about 9 mol %, such as from about 1 mol % to about 8 mol %, such as from about 2 mol % to about 7 mol %, such as about 3 mol %, about 4 mol %, about 5 mol %, or about 6 mol %, or about 7 mol % based on the total moles of product produced. The first oligomerization effluent can have up to about 10 mol % trisubstituted vinylene, such as from about 2 mol % to about 8 mol % trisubstituted vinylene, such as about 5 mol % trisubstituted vinylene based on a moles of vinyls, vinylidenes, disubstituted vinylenes, and trisubstituted vinylenes in the first reactor effluent. The first oligomerization effluent can have up to about 5 mol % of vinyl, such as up to about 3 mol % vinyl, such as about 1 mol % vinyl based on a moles of vinyls, vinylidenes, disubstituted vinylenes, and trisubstituted vinylenes in the first reactor effluent. The first oligomerization effluent can have up to about 5 mol % of disubstituted vinylene, such as up to about 3 mol % disubstituted vinylene, such as about 1 mol % disubstituted vinylene based on a moles of vinyls, vinylidenes, disubstituted vinylenes, and trisubstituted vinylenes in the first reactor effluent.

In at least one embodiment, the first oligomerization process can have a selectivity towards a PAO trimer of about 20 wt % or less, such as about 15 wt % or less, such as about 12 wt % or less, such as about 10 wt % or less, such as from about 0 wt % to about 9 wt %, such as from about 1 wt % to about 8 wt %, such as from about 2 wt % to about 7 wt %, such as about 3 wt %, about 4 wt %, about 5 wt %, or about 6 wt %, based on the total weight of product produced. In some embodiments, the first oligomerization process includes using a decene and dodecene feed(s) and the first oligomerization process can have a selectivity towards dodecene trimer of less than 5 wt %, such as less than 3 wt %, such as less than 1 wt %.

In at least one embodiment, the first oligomerization process can have a selectivity towards a PAO tetramer and/or higher oligomers of alpha-olefins of about 20 wt % or less, such as about 15 wt % or less, such as about 12 wt % or less, such as about 10 wt % or less, such as from about 0 wt % to about 9 wt %, such as from about 1 wt % to about 8 wt %, such as from about 2 wt % to about 7 wt %, such as about 3 wt %, about 4 mol %, about 5 wt %, or about 6 wt %, based on the total weight of product produced.

In at least one embodiment, the first oligomerization process can form an amount (in weight percent, wt %) of PAO dimer of about 40 wt % or more, such as from about 45 wt % to about 100 wt %, such as from about 50 wt % to about 99 wt %, such as from about 55 wt % to about 98 wt %, such as from about 60 wt % to about 95 wt %, such as from about 65 wt % to about 90 wt %, such as from about 70 wt % to about 85 wt %, such as about 70 wt, based on a total amount of product produced. In some embodiments, the first oligomerization process can form an amount of PAO dimer of about 80 wt % or more, such as about 81 wt % or more, about 82 wt % or more, about 83 wt % or more, about 84 wt % or more, about 85 wt % or more, about 86 wt % or more, about 87 wt % or more, about 88 wt % or more, about 89 wt % or more, about 90 wt % or more, about 91 wt % or more, about 92 wt % or more, about 93 wt % or more, about 94 wt % or more, about 95 wt % or more, about 96 wt % or more, about 97 wt % or more, about 98 wt % or more, about 99 wt % or more, or about 100 wt %, based on the total amount of product produced.

In at least one embodiment, the first oligomerization process can form an amount of PAO trimer, PAO tetramer, higher oligomers of alpha-olefin, or a combination thereof of about 60 wt % or less, such as from about 0 wt % to about 55 wt %, such as from about 1 wt % to about 50 wt %, such as from about 2 wt % to about 49 wt %, such as from about 5 wt % to about 40 wt %, such as from about 10 wt % to about 35 wt %, such as from about 15 wt % to about 30 wt %, such as from about 20 wt % to about 25 wt %, based on a total amount of product produced. In some embodiments, the first oligomerization process can form an amount of PAO trimer, PAO tetramer, higher oligomers of alpha-olefin, or a combination thereof of about 20 wt % or less, such as about 0 wt %, about 1 wt % or less, about 2 wt % or less, about 3 wt % or less, about 4 wt % or less, about 5 wt % or less, about 6 wt % or less, about 7 wt % or less, about 8 wt % or less, about 9 wt % or less, about 10 wt % or less, about 11 wt % or less, about 12 wt % or less, about 13 wt % or less, about 14 wt % or less, about 15 wt % or less, about 16 wt % or less, about 17 wt % or less, about 18 wt % or less, or about 19 wt % or less, such as from about 5 wt % to about 15 wt %, such as from about 5 wt % to about 7 wt %, alternatively from about 7 wt % to about 10 wt %, based on the total amount of product produced.

In at least one embodiment, the first oligomerization process can form an amount of vinylidene, based on the total moles of PAO dimer produced, of about 50 mol % or more, such as from about 55 mol % to about 100 mol %, such as from about 60 mol % to about 95 mol %, such as from about 65 mol % to about 90 mol %, such as from about 70 mol % to about 85 mol %, such as from about 75 mol % to about 80 mol %, where PAO dimer includes vinylidenes, disubstituted vinylene, and trisubstituted vinylene. In some embodiments, the first oligomerization process can form an amount of vinylidene, based on the total moles of PAO dimer produced, of about 80 mol % or more, such as about 81 mol % or more, about 82 mol % or more, about 83 mol % or more, about 84 mol % or more, about 85 mol % or more, about 86 mol % or more, about 87 mol % or more, about 88 mol % or more, about 89 mol % or more, about 90 mol % or more, about 91 mol % or more, about 92 mol % or more, about 93 mol % or more, about 94 mol % or more, about 95 mol % or more, about 96 mol % or more, about 97 mol % or more, about 98 mol % or more, about 99 mol % or more, or about 100 mol %, where PAO dimer includes vinylidenes, disubstituted vinylene, and trisubstituted vinylene.

In at least one embodiment, the first oligomerization process can form an amount of disubstituted vinylene, trisubstituted vinylene, or a combination thereof, based on the total moles of PAO dimer produced, of about 50 mol % or less, such as about 0% to about 45%, such as about 7 wt % or less, such as about 6 wt % or less, such as less than about 5 wt % or less, such as from about 1 to about 5 wt %, or from about 5% to about 40%, such as from about 10% to about 35%, such as from about 15% to about 30%, such as from about 20% to about 25%, where PAO dimer includes vinylidenes, disubstituted vinylene, and trisubstituted vinylene.

In at least one embodiment, the amount of conversion in the first oligomerization of LAO to PAO dimer (e.g., vinylidenes, disubstituted vinylene, and trisubstituted vinylene, or a combination thereof), PAO trimer, higher oligomers of alpha-olefin, or a combination thereof can be greater than about 25%, such as greater than about 75%, such as greater than about 80%, such as greater than about 85%, such as greater than about 90%, such as greater than about 95%, such as greater than about 99%.

In at least one embodiment, the LAO can isomerize to branched and/or internal olefin during the first oligomerization. The amount of such isomerization can be less than about 5 wt %, such as less than about 3 wt %, such as less than about 2 wt %, such as less than about 1.9 wt %, such as less than about 1.5 wt %, such as less than about 1 wt %, such as less than about 0.9 wt %, such as less than about 0.5 wt %.

In at least one embodiment, a 2 gallon stainless steel Parr reactor can be used for the first oligomerization process. In some embodiments, the reactor conditions for the first oligomerization process can include a mol ratio of catalyst (e.g., metallocene compound) to activator, an amount of scavenger in the catalyst batch, an amount of scavenger in LAO, an amount of solvent, reactor temperature, reactor pressure, residence time, catalyst loading.

In at least one embodiment, the reactor conditions for the first oligomerization process can include a mol ratio of catalyst to activator of from about 0.1:1 to 10:1, such as from about 0.5:1 to about 5:1, such as from about 0.75:1 to about 3:1, such as from about 1:0.9 to about 1:1.4, such as about 1:1, such as about 1:1.05, about 1:1.10, about 1.2, or about 1:1.15. In some embodiments, the catalyst diluted in toluene at a concentration of from about 0 wt % to about 1 wt % of catalyst in toluene, such as from about 0 to about 0.6 wt %, such as about 0 wt % to about 0.3 wt %, such as about 0.25 wt %.

In at least one embodiment, a 2 gallon stainless steel Parr reactor can be used for the first oligomerization process. In at least one embodiment, the reactor conditions for the first oligomerization process can include an amount of scavenger in LAO of about 0 ppm by weight or greater, such as about 4 ppm or greater, such as from about 5 ppm to about 200 ppm, such as from about 10 ppm to about 5000 ppm, such as about 10 to about 190 ppm, such as from about 30 ppm to about 170, such as from about 50 ppm to about 150 ppm, such as from about 75 ppm to about 125 ppm, or about 0 ppm to about 100 ppm.

In at least one embodiment, the reactor conditions for the first oligomerization process can include a reactor temperature of from about 0° C. to about 300° C., such as from about 10° C. to about 230° C., such as from about 25° C. to about 200° C., such as from about 80° C. to 180° C., such as from about 100° C. to about 160° C., such as from about 110° C. to about 145° C., such as from about 130° C. to about 148° C., such as from about 135° C. to about 145° C. In some embodiments, the reactor conditions for the first oligomerization process can include a reactor temperature of about 130° C., about 131° C., about 132° C., about 133° C., about 134° C., about 135° C., about 136° C., about 137° C., about 138° C., about 139° C., about 140° C., about 141° C., about 142° C., about 143° C., about 144° C., about 145° C., about 146° C., about 147° C., or about 148° C. In at least one embodiment, the reactor conditions for the first oligomerization process can include a reactor temperature of about 120° C. or more, such as from about 130° C. to about 180° C.

In at least one embodiment, the reactor conditions for the first oligomerization process can include a reactor pressure of from about 1.5 psia to about 1500 psia, such as from about 7 psia to about 1200 psia, such as from about 15 psia to about 750 psia, such as from about 0 psia to about 100 psia, such as about 20 psia to 50 psia, such as about 20 psia to 35 psia. In some embodiments, the reactor conditions for the first oligomerization process can include a reactor pressure of about 25 psia, about 26 psia, about 27 psia, about 28 psia, about 29 psia, about 30 psia, about 31 psia, about 32 psia, about 33 psia, about 34 psia, or about 35 psia.

In at least one embodiment, the reactor conditions for the first oligomerization process can include a residence time such as less than about 72 hours, such as from about 1 minute to about 20 hr, such as from about 5 min to about 10 hr, such as from about 30 min to about 9 hr, such as from about 1 hr to about 5 hr, such as from about 1 hr to about 4 hr, such as from 2 hr to 3 hr, such as about 2 hr, such as about 3 hr, or from about 3 hr to about 4 hr. In at least one embodiment, the reactor conditions for the first oligomerization process can include a residence time of about 24 hours or less, such as about 10 hours or less, such as about 5 hours or less, such as about 3 hours or less.

In at least one embodiment, the reactor conditions for the first oligomerization process can include a catalyst concentration of greater than about 5 ppm by weight, such as from about 5 ppm to about 100 ppm, such as from about 10 ppm to about 100 ppm, such as from about 10.5 ppm to 30 ppm, such as from about 15 ppm to about 30 ppm.

In at least one embodiment, a 2 gallon stainless steel Parr reactor can be used for the first oligomerization process. In at least one embodiment, the reactor conditions for the first oligomerization process can include a catalyst flow rate of about 5 mgCat/hr to about 70 mgCat/hr, such as about 6 mgCat/hr to about 60 mgCat/hr, such as about 10 mgCat/hr to about 60 mgCat/hr, such as about 25 mgCat/hr to 35 mgCat/hr, such as 20 mgCat/hr, or from about 40 mgCat/hr to about 50 mgCat/hr, such as about 45 mgCat/hr, or about 50 mgCat/hr to about 70 mgCat/hr, such is as about 60 gCat/hr.

In at least one embodiment, the reactor conditions for the first oligomerization process can include a total flow rate of the alpha-olefin feed of greater than about 100 g/hr, such as from about 200 g/hr to 45,000 kg/hr, such as from about 1,000 g/hr to 15,000 kg/hr, such as from about 1,500 g/hr to 1,000,000 g/hr, such as from 1,800 g/hr to 10,000 g/hr, such as about 1,900 g/hr, such as about 2,080 g/hr. In some embodiments, the individual flow rate of one or more alpha-olefins in the feed can be predetermined based on molecular weight. In some embodiments, the flow rate of each of a first and second alpha-olefin in the feed can be adjusted so that the first and second alpha-olefin is fed at a weight ratio of from about 5:1 to 1:5, such as from about 3:1 to 1:3, such as 1:1, of first to second alpha-olefin. For example, the alpha-olefin feed can include from about 0 wt % to about 100 wt % decene, such as about 20 wt % to about 80 wt % decene and about 0 wt % to about 100 wt % dodecene, such as about 20 wt % to about 80 wt % dodecene in the alpha-olefin feed, such as from about 20 wt % to about 60 wt % decene and from about 40 wt % dodecene to about 80 wt % dodecene, such as from 30 wt % to about 60 wt % decene, such as about 35 wt % to about 60 wt % decene, and from about 35 wt % to about 65 wt % dodecene, such as from about 40 wt % to about 65 wt % dodecene, alternatively from about 50 wt % decene to about 80 wt % decene and from about 20 wt % to about 50 wt % dodecene, such as from about 60 wt % to about 70 wt % decene and from about 30 wt % to about 40 wt % dodecene. In some embodiments, the first alpha-olefin can be fed to the reactor separately from the second alpha-olefin. For example, each of the feed rates can be adjusted relative to one another based on the the desired ratio of the feeds. The LAO monomers can be selected in order to arrive at a predetermined PAO product with suitable product attributes. In some embodiments, the alpha-olefins can include decene and dodecene and the first reactor effluent can include PAO dimer with an average number of carbon atoms of about $C_{21}$ to $C_{23}$, such as from $C_{22}$ to $C_{23}$.

It is becoming increasing more difficult for the industry to keep up with the demand for lubricating basestocks having properties similar to C10-based PAOs. It would be highly beneficial if the range of linear alphaolefins that could be used to make such basestocks could be extended. The present inventors have discovered that the use of a two step oligomerization process a combination of LAOs ranging from C6-C14 can yield useful basestocks having properties, in some embodiments, similar to 1-decene based PAOs. A combination of monomers can be selected to minimize 1-decene content while maintaining an average monomer length of between C9 and C11. One consideration is that the effluent of the metallocene reactor used in the second oligomerization unit should comprise enough dimer to react with monomer that is introduced in the second reactor to produce trimer. Unreacted decene dimer and monomer can reduce the value of the final product and is typically avoided or removed. Moreover, trimer and heavier components of monomers other than decene, such as dodecene is also considered to reduce the the value of the product, or require additional separation steps to remove. Thus, the ratio of decene to dodecene can be selected to reduce reliance on decene, reduce additional process steps, and provide a product that meets predetermined specifications.

In at least one embodiment, the reactor conditions for the first oligomerization process can include a flow rate of the alpha-olefin of about 100 grams alpha-olefin per hour (ghr) or more, such as from about 150 g/hr to about 7,500 g/hr, such as from about 300 g/hr to about 3,000 g/hr, such as from about 500 g/hr to about 2,000 g/hr, such as from about 750 g/hr to about 1,500 g/hr, alternatively from about 200 g/hr to about 45,000,000 g/hr, such as from about 1,000 g/hr to about 15,000,000 g/hr, such as from 1,5000 g/hr to about 1,000,000 g/hr, such as from 1,800 g/hr to about 10,000 g/hr, such as about 1,900 g/hr, such as about 2,080 g/hr.

In at least one embodiment, the reactor conditions for the first oligomerization process can include one or more of the following conditions: a molar ratio of catalyst:activator of from about 1:0.9 to about 1:1.4, such as about 1:1.1, such as about 1:1.2, such as about 1:1.02, in toluene with about 0 ppm to about 5000 ppm by weight of TNOA, such as about 0 to about 50 ppm TNOA, such as about 20 ppm to about 35 ppm TNOA; the activator can be N,N-dimethylanilinium tetrakis (pentafluorophenyl)borate; a total alpha-olefin (LAO) flow rate of from about 1,900 g/hr to about 2,200 g/hr, such as about 2080 g/hr; a catalyst loading of about 50,000 gLAO/gCat to about 75,000 gLAO/gCat, such as about 65,000 gLAO/gCat; a catalyst system flow rate of about 0.2 mL/min to about 0.3 mL/min, such as about 0.24 mL/min (12.7 g/hr); an amount of TNOA as scavenger in LAO of about 0 ppm to about 5000 ppm, such as from about 0 ppm to about 100 ppm; a temperature of from about 110° C. to about 145° C.; and/or a residence time of about 1 hour to about 6 hours, such as about 2 hours to about 3 hours.

In at least one embodiment, two or more $C_2$-$C_{32}$ alpha-olefins can be used as one or more feeds to the first oligomerization process, such as $C_4$-$C_{32}$ alpha-olefins, such as $C_6$-$C_{30}$ alpha-olefins, such as $C_6$-$C_{24}$ alpha-olefins, such as $C_6$-$C_{18}$ alpha-olefins, $C_8$-$C_{18}$ alpha-olefins, $C_6$ to $C_{16}$ alpha-olefins, $C_6$-$C_{12}$ alpha-olefins, or a combination thereof. Non-limiting examples of alpha-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and a combination thereof. In some embodiments, the alpha-olefin includes at least decene and dodecene.

In at least one embodiment, hydrogen is optionally added to the reactor at a concentration of about 0 psi to about 100 psi; such as from about 0 psi to about 50 psi, such as from about 5 to about 10 psi.

In some embodiments, the polymerization reaction results in the first reactor effluent having a number average molecular weight (Mn) of about 1500 g/mol or less, such as from about 250 g/mol to about 800 g/mol, such as about 290 g/mol to about 310 g/mol, as measured by GC.

In some embodiments, the catalyst system further comprises a non-coordinating anion type activator, such as wherein the non-coordinating anion type activator comprises: dimethylanilinium tetrakisperfluorophenylborate, dimethylanilinium tetrakisperfluoronaphthylborate, triphenylcarbonium tetrakisperfluorophenylborate, triphenylcarbonium tetrakisperfluoronaphthylborate, dimethylanilinium tetrakisperfluorophenylaluminate, dimethylanilinium tetrakisperfluoronaphthylaluminate, or a combination thereof.

In some embodiments of the process, two or more $C_6$-$C_{24}$ alpha-olefins can be introduced to the polymerization reactor; and any combination of $C_2$-$C_5$ alpha-olefins are collectively present at no higher than 25 mol %, based on the total moles of the alpha-olefins supplied to the polymerization reactor, such as wherein the alpha-olefins are substantially free of ethylene, propylene, $C_4$ alpha-olefins, and $C_5$ alpha-olefins; or a combination thereof. In some embodiments, the alpha-olefins are substantially free (or absent, 0 mol %) of propylene, $C_4$ alpha-olefins, and $C_5$ alpha-olefins; or a combination thereof and optionally comprises less than 25 mol % ethylene, such as less than 15 mol %, such as less than 5 mol %.

In embodiments of the present disclosure, an unsaturated poly alpha-olefin product comprises greater than or equal to about 80 mol % vinylidenes, such as 90 mol % vinylidenes, such as 96.5 mol % vinylidenes, based on total moles of vinyls, vinylidenes, disubstituted vinylenes, and trisubstituted vinylenes contained therein. In some embodiments, the unsaturated poly alpha-olefin product comprises 96.5 mol % to 99.9 mol % of vinylidenes; 0.1 mol % to 3.5 mol % of trisubstituted vinylenes; 3.0 mol % or less of disubstituted vinylenes; 3.0 mol % or less of vinyl groups; based on is total moles of vinylidenes, trisubstituted vinylenes, disubstituted vinylenes, and vinylidenes contained therein; and a number average molecular weight (Mn) of 1500 g/mol or less as measured by $^1$H NMR.

In some embodiments, the unsaturated poly alpha-olefin product comprises less than or equal to about 1.0 mol % disubstituted vinylenes, when present; less than or equal to about 1.0 mol % vinyl groups when present; and a number average molecular weight (Mn) of 1000 g/mol or less as measured by $^1$H NMR.

In some embodiments, the unsaturated poly alpha-olefin product comprises from 98 mol % to 99.5 mol % of a combination of vinylidenes and trisubstituted vinylenes; 0.5 mol % to 2 mol % of a combination of disubstituted vinylenes and vinyl groups, and a number average molecular weight (Mn) of 800 g/mol or less as measured by $^1$H NMR.

In at least one embodiment, the unhydrogenated poly alpha-olefin product can be used as an intermediate for other products such as dimerization to make a wax.

In at least one embodiment, the heavy oligomers (degree of oligomerization of at least 3) are separated from dimers, and the heavy oligomers are hydrogenated to create a finished PAO lubricant. In at least one embodiment, the kinematic viscosity at 100° C. of at least a portion of the hydrogenated first reactor effluent (e.g., the trimer and heavier oligomers) can be less than 5 cSt, such as 4 cSt.

In at least one embodiment, the Noack volatility of at least a portion of the hydrogenated first reactor effluent (e.g., the trimer) can be less than 15 wt %, such as less than 13 wt %.

In at least one embodiment, the rotating pressure vessel oxidation test (RPVOT) of at least a portion of the hydrogenated first reactor effluent (e.g., the trimer) can be greater than 40 minutes, such as greater than 60 minutes, such as greater than 75 minutes.

II. Process for Producing Pao Trimers From PAO Dimers

The present disclosure also includes processes using catalysts to improve yields for producing PAO trimer, such as a low viscosity PAO trimer. Conventional methods of forming PAO trimers involve a reaction of a PAO dimer feedstock made from an oligomerization process that contains a significant amount of disubstituted vinylene as well as PAO trimer, PAO tetramer, and higher oligomers of alpha-olefin. The disubstituted vinylene, however, is not highly reactive is when added to a second oligomerization process (e.g., a BF$_3$ catalyzed process), and the reaction kinetics are very slow. In addition, the unreacted dimer in the stream going into the BF$_3$ catalyzed conventional reactor contaminates the stream produced out of the BF$_3$ process and reduces the value of that by-product.

It has been discovered that reducing (or eliminating) the amount of disubstituted vinylene in the PAO dimer feedstock from the first oligomerization process can provide production of a PAO trimer product at higher yields and higher purity than conventional processes. In addition, the higher purity intermediate PAO (e.g., the PAO dimer feedstock) produced from the first oligomerization process (having lower amounts of PAO trimer, lower amounts of PAO tetramer, and lower amounts of higher oligomers of alpha-olefin relative to conventional PAO dimer feedstocks) provides the production of high amounts of PAO trimer from the second oligomerization process. It has been discovered that the catalyst system and processes of the present disclosure provides the blending of two or more alpha-olefins in at least the first reactor to produce high purity intermediate PAO and high amounts of PAO trimer from the second oligomerization process.

The PAO produced from the first oligomerization process described in Section I above can include dimer (such as vinylidene dimers), trimer, optionally tetramer and higher oligomers of the respective alpha-olefin feedstocks, or a combination thereof. This PAO produced from the first oligomerization process described above is referred to interchangeably as "intermediate PAO" and "first reactor effluent." The oligomerization process described in Section I above can be performed in a first reactor, e.g., a metallocene reactor. The PAO produced from the second oligomerization process is referred to interchangeably as "hybrid trimer," and "second reactor effluent." The second oligomerization may be performed in a second reactor, and the second reactor may include one or more sub-reactors.

The hybrid trimer process is referred to interchangeably as "second oligomerization process" or "second oligomerization."

The intermediate PAO (e.g., the PAO dimer feedstock) may be used as the sole olefin feedstock to the second oligomerization process or may be used together with an alpha-olefin feedstock of the type used as the olefin starting material for the first oligomerization process. Other portions of the effluent from the first oligomerization process may also be used as a feedstock to the second oligomerization process, including unreacted LAO. Alpha-olefins with the same is attributes as those used for the first oligomerization process may be used for the second oligomerization. Typical ratios for the PAO dimer portion of the intermediate PAO to the alpha-olefins fraction of the intermediate PAO can be from about 90:10 to about 10:90, such as from about 80:20 to about 20:80 by weight. In at least one embodiment, the PAO dimer of the intermediate PAO can make up about 50 mol % of the olefinic feed material since the properties and distribution of the final product, dependent in part upon the starting material, can be favorably affected by feeding the intermediate PAO at an equimolar ratio with the alpha-olefins.

In at least one embodiment, the olefins introduced to the second oligomerization process can have a distribution of PAO dimer, PAO trimer, PAO tetramer, higher oligomers of alpha-olefin, or a combination thereof, can have the same distribution of effluent produced in the metallocene dimer selective process described in Section I.

In some embodiments, the second oligomerization process can occur in an oligomerization unit. In some embodiments, the second oligomerization can include one or more alpha-olefins. In at least one embodiment, the alpha-olefins for the second oligomerization reactor is a product from the metallocene dimer selective process described in Section I. In some embodiments, the alpha-olefins introduced to the oligomerization unit can include at least a portion of the first effluent the metallocene dimer selective process described in Section I and a second catalyst system. In some embodiments, the alpha-olefins introduced to the oligomerization unit further includes one or more additional C$_6$-C$_{32}$ alpha-olefins, such as an LAO. For example, the first effluent from the metallocene dimer selective process described in Section I can be stripped of monomer (e.g., by distillation) before entering the oligomerization unit. The first effluent can include PAO dimer with at least one carbon-carbon unsaturated double bond. Portions of the PAO dimer can include vinylidene dimers, disubstituted vinylenes, trisubstituted vinylenes, or a combination thereof. The distribution of vinylidene dimers, disubstituted vinylenes, trisubstituted vinylenes, or a combination thereof in the PAO dimer can have the distribution as described above.

The structure of the intermediate PAO can be such that, when reacted in a second oligomerization, the intermediate PAO can react with the LAO to form a "hybrid trimer" at high yields. This allows for high conversion and yield rates of the PAO products. In at least one embodiment, the PAO product from the second oligomerization comprises primarily a hybrid trimer formed from the dimer and the respective LAO feedstock. In some embodiments the olefins fed to the second oligomer reactor includes from about 50 wt % to about 90 wt % of first reactor effluent, such as from about 60 wt % to about 80 wt % of first reactor effluent, such as from 65 wt % to about 75 wt % of first reactor effluent, such as about 70 wt % first reactor effluent, the first reactor effluent stripped of monomers.

Any suitable oligomerization process and acid catalyst composition may be used for the second oligomerization process. A catalyst for the second oligomerization can be a non-transition metal catalyst. A catalyst can be a Lewis acid catalyst. U.S. Patent Application Publication Nos. 2009/0156874 and 2009/0240012 describe a process that can be used for the second oligomerization, to which reference is made for details of feedstocks, compositions, catalysts and co-catalysts, and process conditions. The Lewis acid catalysts of US 2009/0156874 and US 2009/0240012 include the metal and metalloid halides conventionally used as Friedel-Crafts catalysts, and examples include AlCl$_3$, BF$_3$, AlBr$_3$, TiCl$_3$, and TiCl$_4$ either alone or with a protic promoter/activator. Boron trifluoride is commonly used but not particularly suitable unless it is used with a protic promoter. Useful co-catalysts are well known and described in detail in US 2009/0156874 and US 2009/0240012. Solid Lewis acid catalysts, such as synthetic or natural zeolites, acid clays, polymeric acidic resins, amorphous solid catalysts such as silica-alumina, and heteropoly acids such as the tungsten zirconates, tungsten molybdates, tungsten vanadates, phosphotungstates and molybdotungstovanadogermanates (e.g., WOx/ZrO$_2$, WOx/MoO$_3$) may also be used although these are not generally as favored economically. Additional process conditions and other details are described in detail in US 2009/0156874 and US 2009/0240012, and incorporated herein by reference.

In at least one embodiment, the second oligomerization can be performed in the presence of BF$_3$ and at least one activator such as an alcohol, or the second oligomerization can be performed in the presence of BF$_3$ and at least two different activators selected from alcohols and/or alkyl acetates. The alcohols can be $C_1$ to $C_{10}$ alcohols and the alkyl acetates are $C_1$ to $C_{10}$ alkyl acetates. For example, both co-activators are $C_1$ to $C_6$ based compounds. Two example combinations of co-activators can be i) ethanol and ethyl acetate and ii) n-butanol and n-butyl acetate. The molar ratio of alcohol to alkyl acetate can be from about 0.2:1 to about 5:1, such as about 0.3:1 to about 3:1, such as from about 0.5:1 to about 1.5:1, such as about 1:1. In at least one embodiment, the co-activators is n-butanol and n-butyl acetate in a molar ratio of n-butanol to n-butyl acetate of about 0.3:1 to about 3:1, such as about 0.5:1 to about 1.5:1, such as about 1:1.

Temperatures for the second oligomerization in the second reactor can be from about 0° C. to about 60° C., such as from about 10° C. to about 40° C., such as from about 10° C. to about 55° C., such as from about 20° C. to about 40° C., from about 10° C. to about 40° C., or from about 15° C. to about 25° C. In at least one embodiment, the temperatures for the second oligomerization in the second reactor can be less than about 32° C., such as from about 15° C. to about 30° C., such as from about 20° C. to about 25° C., such as about 21° C.

In at least one embodiment, the acid catalyst composition loading for the second oligomerization can be from about 0.5 mmol per 100 g LAO (mmolCat/100 gLAO) to about 40 mmolCat/100 gLAO, such as from about 2 mmolCat/100 gLAO to about 40 mmolCat/100 gLAO, such as from about 5 mmolCat/100 gLAO to about 20 mmolCat/100 gLAO, such as from about 5 mmolCat/100 gLAO to about 15 mmolCat/100 gLAO, such as from about 6 mmolCat/100 gLAO to about 15 mmolCat/100 gLAO, such as about 15 mmolCat/100 gLAO, about 10 mmolCat/100 gLAO, or about 12 mmolCat/100 gLAO.

In at least one embodiment, the LAO feedstock for the second oligomerization (as well as the first oligomerization) can be one or more $C_2$-$C_{32}$ alpha-olefins, such as a $C_4$-$C_{32}$ alpha-olefin, $C_6$-$C_{30}$ alpha-olefin, such as a $C_6$-$C_{24}$ alpha-olefin, such as a $C_6$-$C_{18}$ alpha-olefin, a $C_8$-$C_{18}$ alpha-olefin, a $C_6$ to $C_{16}$ alpha-olefin, or a $C_6$-$C_{12}$ alpha-olefin, or a combination thereof. Non-limiting examples of LAOs can be 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-octadecene, 1-icocene, $C_{22}$, $C_{24}$, $C_{26}$, $C_{28}$, $C_{30}$, or $C_{32}$ LAOs, or a combination thereof. In at least one embodiment, the LAO feedstock can include at least octene. In at least one embodiment, the LAO feedstock for the second oligomerization can include at least octene and/or decene. For example, the LAO feedstock for the second oligomerization can include from about 50 mol % octene to about 100 mol % octene and from about 0 mol % decene to about 50 mol % decene, such as from 60 mol % to about 80 mol % octene and from about 20 mol % decene to about 40 mol % decene. In at least one embodiment, the LAO feedstock for the second oligomerization can include at least octene, decene, and dodecene. For example, the LAO feedstock for the second oligomerization can include from about 0 wt % octene to about 90 wt % octene, such as from about 0 wt % to about 40 wt % octene, such as from about 0 wt % to about 30 wt % octene, such as from about 15 wt % to about 20 wt % octene, such as about 22 wt % octent, from about 0 wt % decene to about 40 wt % decene, and from about 0 wt % to about 20 wt % dodecene, such as from 0 wt % to about 40 wt % octene, from about 1 wt % decene to about 30 wt % decene, and from about 0 wt % to about 20 wt % dodecene.

The LAO feedstock for the second reactor is selected to react with the intermediate PAO dimer of the first reactor effluent to produce a PAO trimer with predetermined properties. It has been discovered that a final product with similar properties to decene based PAO can be achieved by using monomers with an average length of all the monomers of from about C9 to about C11, such as C10. While it is possible to use decene having a carbon length of C10, other monomers can be used to reduce dependency on decene feed. It has also been discovered that feeding C8 and C12 into the same reactor can cause byproduct variation in the final reaction. Thus, it is possible to decrease the amount of undesirable byproducts by feeding C8 and C12 in separate reactors. For example, C8, C10, and C12 can be introduced into both the first and second reactor to produce a final hybrid trimer can be as short as C24 (trimer of C8) and as long as C36 (trimer of C12). In contrast, as shown in the present disclosure, feeding C10 and C12 in the first reactor, separating out the monomers, and then feeding C8 and C10 into the second reactor, the final trimer has significantly less variation. The shortest trimer will be C28, which is the product of C10 dimer and C8 monomer and the longest trimer will be C34, which is product of C12 dimer and C10 monomer. This reduction in trimer variability significant improves control over the process and improves volatility properties of the final product.

Moreover the ratio of first reactor effluent to the LAO feedstock for the second reactor is important to minimize unreacted components such as unreacted dimer and monomers. In some embodiments, dodecene can be added to the second reactor in a ratio that does not encourage random oligomerization of dodecene which produces dodecene trimer and other heavy components in the second reactor effluent.

In some embodiments, from about 50 wt % to about 90 wt % of the total LAO feedstock is introduced in the first oligomerization process and from about 10 wt % to about 50 wt % of the LAO feedstock is introduced in the second oligomerization process, such as from about 60 wt % to about 80 wt % of the total LAO feedstock is introduced in the first oligomerization process and from about 20 wt % to about 40 wt % of the total LAO feedstock is introduced to the second reactor in the second oligomerization process.

In at least one embodiment, a molar ratio of the PAO dimer of the intermediate PAO to LAO for the second oligomerization process can be from about 1.5:1 to about 10:1, such as from about 2:1 to about 5:1, such as from about 3:1 to about 4:1. In at least one embodiment, a molar is ratio of the PAO dimer (of the intermediate PAO) to LAO for the second oligomerization process can be from about 0.1:1 to about 10:1, such as from about 0.5 to about 5:1, such as from about 0.5:1 to about 3:1, such as from about 0.8:1 to about 1.2:1, such as from about 0.9:1 to about 1.1:1.

In at least one embodiment, the reactor conditions for the second oligomerization can include a reactor pressure of from about 10 psia to about 50 psia, such as from about 15 psia to about 50 psia, such as from about 15 psia to 30 psia, such as from about 19 psia to about 21 psia, such as about 20 psia.

In at least one embodiment, the second oligomerization can be carried out in two reactors in series, such as two continuous stirred tank reactors (CSTRs) in series. In some embodiments, the residence time in the first reactor of the second oligomerization can be from about 0.1 hr to about 10 hr, such as from 0.25 hr to about 5 hr, such as from about 0.5 hr to about 3 hr, such as about 1.56 hr, and the residence time in the second reactor of the second oligomerization can be from about 0.1 hr to about 10 hr, such as from about 0.25 hr to about 5 hr, such as from about 0.25 hr to about 3 hr, such as about 0.78 hr.

In at least one embodiment, the second oligomerization can be carried out in one reactor such as a CSTR. In some embodiments, the residence time in the reactor for the second oligomerization can be from about 1 min to 10 hr, such as from about 1 hr to about 7 hr, such as from about 1 hr to about 2 hr.

In at least one embodiment, the incorporation of PAO dimer of the intermediate PAO into hybrid trimer, tetramer, higher oligomers, or a combination thereof can be about 75% or more, such as about 80% or more, such as about 85% or more, such as about 90% or more, such as about 95% or more, such as about 99% or more; the conversion of the LAO can be about 75% or more, such as about 80% or more, such as about 85% or more, such as about 90% or more, such as about 95% or more, such as about 99% or more; and/or the yield % of about 75% or more, such as about 80% or more, such as about 85% or more, such as about 90% or more, such as about 95% or more, such as about 99% or more.

In at least one embodiment, the yield % of PAO trimer in the second reactor effluent is about 60 wt % or more, such as about 70 wt % or more, such as about such as about 75 wt % or more, such as about 76 wt % or more, such as about 77 wt % or more, such as about 78 wt % or more, 79 wt % or more, such as about 80 wt % or more, such as about 81 wt % or more, such as about 82 wt % or more, such as about 83 wt % or more, such as about 84 wt % or more, such as about 85 wt % or more, such as about 86 wt % or more, such as about 87 wt % or more, such as about 88 wt % or more, such as about 89 wt % or more, such as about 90 wt % or more, such as about 91 wt % or more, such as about 92 wt % or more, such as about 93 wt % or more, such as about 94 wt % or more, such as about 95 wt % or more, based on a total weight of PAO dimer, PAO trimer, PAO tetramer, and higher oligomers of alpha-olefin in the second reactor effluent.

In at least one embodiment, the second oligomerization process can have a selectivity towards hybrid trimer of about 60 wt % or more, such as about 70 wt % or more, such as about 75 wt % or more, such as about 76 wt % or more, such as about 77 wt % or more, such as about 78 wt % or more, 79 wt % or more, such as about 80 wt % or more, such as about 81 wt % or more, such as about 82 wt % or more, such as about 83 wt % or more, such as about 84 wt % or more, such as about 85 wt % or more, such as about 86 wt % or more, such as about 87 wt % or more, such as about 88 wt % or more, such as about 89 wt % or more, such as about 90 wt % or more, such as about 91 wt % or more, such as about 92 wt % or more, such as about 93 wt % or more, such as about 94 wt % or more, such as about 95 wt % or more, based on a total weight of PAO dimer, PAO trimer, PAO tetramer, and higher oligomers of alpha-olefin in the second reactor effluent.

In at least one embodiment, the yield % of PAO dimer, PAO tetramer, higher oligomers of alpha-olefin, or a combination thereof, in the second reactor effluent can be about 40 wt % or less, such as about 30 wt % or less, such as about 25 wt % or less, such as about 24 wt % or less, such as about 23 wt % or less, such as about 22 wt % or less, such as about 21 wt % or less, such as about 20 wt % or less, such as about 18 wt % or less, such as about 17 wt % or less, such as about 15 wt % or less, such as about 14 wt % or less, such as about 12 wt % or less, such as about 11 wt % or less, such as about 10 wt % or less, such as about 9 wt % or less, such as about 8 wt % or less, such as about 7 wt % or less, such as about 6 wt % or less, such as about 5 wt % or less, such as about 3 wt % or less, based on a total weight of PAO dimer, PAO trimer, PAO tetramer, and higher oligomers of alpha-olefin in the second reactor effluent.

In at least one embodiment, the second oligomerization process can have a selectivity towards PAO dimer, PAO tetramer, higher oligomers of alpha-olefin, or a combination thereof, of about 40 mol % or less, such as about 30 mol % or less, such as about 25 mol % or less, such as about 24 mol % or less, such as about 23 mol % or less, such as about 22 mol % or less, such as about 21 mol % or less, such as about 20 mol % or less, such as about 19 mol % or less, such as about 18 mol % or less, such as about 17 mol % or less, such as about 16 mol % or less, such as about 15 mol % or less, such as about 14 mol % or less, such as about 13 mol % or less, such as about 12 mol % or less, such as about 11 mol % or less, such as about 10 mol % or less, such as about 9 mol % or less, such as about 8 mol % or less, such as about 7 mol % or less, such as about 6 mol % or less, such as about 5 mol % or less, based on a total moles of PAO dimer, PAO trimer, PAO tetramer, and higher oligomers of alpha-olefin in the second reactor effluent.

In at least one embodiment, the monomer can be optional as a feedstock in the second reactor (e.g., an oligomerization reactor). In some embodiments, the first reactor effluent comprises unreacted monomer, and the unreacted monomer can be fed to the second reactor. In some embodiments, monomer can be fed into the second reactor, and the monomer can be an LAO selected from the group including 1-hexene, 1-octene, 1-nonene, 1-decene, 1-undecene, 1-dodecene, 1-tetradecene, 1-hexadecene. In some embodiments, the PAO produced in the second oligomerization can be derived from the PAO dimer portion of the intermediate PAO plus only one monomer to form one or more trimers. In some embodiments, the PAO produced in the second oligomerization can be derived from the PAO dimer of the intermediate PAO plus two or more monomers, or three or more monomers, or four or more monomers, or even five or more monomers. For example, the PAO dimer plus a $C_8$, $C_{10}$, $C_{12}$-LAO mixture, or a $C_6$, $C_7$, $C_8$, $C_9$, $C_{10}$, $C_{11}$, $C_{12}$, $C_{13}$, $C_{14}$-LAO mixture, or a $C_4$, $C_6$, $C_8$, $C_{10}$, $C_{12}$, $C_{14}$, $C_{16}$, $C_{18}$-LAO mixture can be used as a feed to form trimers.

In at least one embodiment, the second reactor effluent may contain trace amounts of transition metal compound if the catalyst in the first or subsequent oligomerization is a metallocene catalyst. A trace amount of transition metal compound may be any amount of transition metal compound or Group 4 metal present in the PAO. Presence of Group 4 metal may be detected at the ppm or ppb level by ASTM 5185.

In at least one embodiment, the average number of carbon atoms of the trimer in the second reactor effluent is from about $C_{24}$ to about $C_{36}$, such as about $C_{30}$ to about $C_{32}$, such as about $C_{31}$. In some embodiments, the second reactor effluent is stripped of monomer and dimer.

In at least one embodiment, the second reactor effluent or a portion of the second reactor effluent is hydrogenated to a Bromine number less than about 2, such as less than about 1.

In at least one embodiment, the kinematic viscosity at 100° C. of the second reactor effluent or a portion of the second reactor effluent (e.g., the hybrid trimer) can be less than about 10 cSt, such as less than about 6 cSt, such as less than about 4.5 cSt, such as from about 3.5 cSt to about 4.5 cSt, such as from about 3.8 cSt to about 4.3 cSt. In some embodiments, the second reactor effluent or a portion of the second reactor effluent is hydrogenated to form a hydrogenated second reactor effluent having a kinematic viscosity at 100° C. less than about 10 cSt, such as less than about 6 cSt, such as less than about 4.5 cSt, such as less than about 3.2 cSt, such as from about 3.5 cSt to about 4.5 cSt, such as about 3.8 cSt, about 3.9 cSt, or about 4.0 cSt.

In at least one embodiment, the kinematic viscosity at 40° C. of the second reactor effluent or a portion of the second reactor effluent can be less than about 25 cSt, such as from about 15 cSt to about 18 cSt, such as from about 16 cSt to about 17 cSt. In some embodiments, the second reactor effluent or a portion of the second reactor effluent is hydrogenated to form a hydrogenated second reactor effluent having a kinematic viscosity at 40° C. of the second reactor effluent or a portion of the second reactor effluent can be less than about 25 cSt, such as between about 15 cSt to about 18 cSt, such as from about 16 cSt to about 17 cSt, such as about 16.2 cSt, about 16.3 cSt, about 16.4 cSt, about 16.5 cSt, about 16.6 cSt, about 16.7 cSt, about 16.8 cSt, about 16.9 cSt, about 17.0 cSt, or about 17.1 cSt.

In at least one embodiment, the kinematic viscosity at −40° C. of the second reactor effluent or a portion of the second reactor effluent can be less than about 3000 cSt, such as from about 1500 cSt to about 3000 cSt, such as from 2000 cSt to about 2500 cSt, such as about 2100 cSt to about 2200 cSt, such as about 2175 cSt to about 2190 cSt.

In at least one embodiment, the pour point of the second reactor effluent or a portion of the second reactor effluent can be below about −30° C., such as below about −40° C., such as below about −50° C., such as below about −60° C., such as below about −70° C., such as below about −80° C. In some embodiments, the second reactor effluent or a portion of the second reactor effluent is hydrogenated to form a hydrogenated second reactor effluent having a pour point of the second reactor effluent or a portion of the second reactor effluent can be below about −30° C., such as below about −40° C., such as below about −50° C., such as below about −60° C., such as below about −70° C., such as below about −80° C. In at least one embodiment, the hydrogenated second reactor effluent can have a pour point of from about −70° C. to about −60° C., such about −63° C., or about −69° C.

In at least one embodiment, the Noack volatility of the second reactor effluent or a portion of the second reactor effluent can be less than about 19 wt %, such as less than about 14 wt %, such as less than about 12 wt %, such as less than about 10 wt %, such as less than about 9 wt %, such as less than about 8.5 wt %, such as less than about 8 wt %, such as less than about 7.5 wt %. In some embodiments, the second reactor effluent or a portion of the second reactor effluent is hydrogenated to form a hydrogenated second reactor effluent having a Noack volatility of the second reactor effluent or a portion of the second reactor effluent can be less than about 19 wt %, such as less than about 14 wt %, such as less than about 12 wt %, such as less than about 10 wt %, such as less than about 9 wt %, such as less than about 8.5 wt %, such as less than about 8 wt %, such as less than about 7.5 wt %. In some embodiments, the hydrogenated second reactor effluent can have a Noack volatility of from about 10 wt % to about 12 wt %, such as about 10.5 wt %, about 10.6 wt %, about 10.7 wt %, about 10.8 wt %, about 10.9 wt %, or from 11.5 wt % to about 11 wt %.

In at least one embodiment, the viscosity index of the second reactor effluent or a portion of the second reactor effluent can be more than about 120, such as more than about 121, such as more than about 125, such as more than about 130, such as more than about 135, such as more than about 136. In some embodiments, the second reactor effluent or a portion of the second reactor effluent is hydrogenated to form a hydrogenated second reactor effluent having a viscosity index of the second reactor effluent or a portion of the second reactor effluent can be more than about 120, such as more than about 121, such as more than about 125, such as more than about 130, such as more than about 135, such as more than about 136. In some embodiments, the hydrogenated second reactor effluent can have a viscosity index of from about 130 to about 140, such as from 134 to 136, about 134, about 135, or about 136.

In at least one embodiment, the cold crank simulator value (CCS) at −35° C. of the second reactor effluent or a portion of the second reactor effluent may be not more than about 1200 cP, such as not more than about 1000 cP, such as not more than about 900 cP. In some embodiments, the second reactor effluent or a portion of the second reactor effluent is hydrogenated to form a hydrogenated second reactor effluent having a cold crank simulator value (CCS) at −35° C. of the second reactor effluent or a portion of the second reactor effluent may be not more than about 1200 cP, such as not more than about 1000 cP, such as not more than about 900 cP. In some embodiments, the hydrogenated second reactor effluent can have a CCS of from about 1000 cP to about 1200 cP, such as from about 1050 cP to about 1100 cP, such as about 1090 cP, or from about 1150 cP to about 1200 cp, such as from 1190 cP to about 1195 cP.

In some embodiments, the second reactor effluent or a portion of the second reactor effluent is hydrogenated to form a hydrogenated second reactor effluent having a rotating pressure vessel oxidation test (RPVOT) of about 70 min or more, such as about 80 min or more, such as about 90 min or more, such as about 100 min or more, such as about 110 min, such as about 108 min.

In at least one embodiment, the second reactor effluent or a portion of the second reactor effluent can have a kinematic viscosity at 100° C. of from about 3.5 cSt to about 4.5 cSt and a Noack volatility of from about 10 wt % to about 12 wt %. In at least one embodiment, the second reactor effluent or a portion of the second reactor effluent can have a kinematic viscosity at 100° C. of from about 3.8 cSt to about 4.3 cSt and a Noack volatility of not more than about 12 wt %. In at least one embodiment, the second reactor effluent or a portion of the second reactor effluent is hydrogenated to form a hydrogenated second reactor effluent having have a kinematic viscosity at 100° C. of from about 3.8 cSt to about 4.3 cSt and a Noack volatility of not more than about 12 wt %.

In some embodiments, PAO products (e.g., unhydrogenated LAO dimers and trimers) of the present disclosure can be functionalized with one or more reactants (and can be optionally hydrogenated) through various chemical reactions to produce a functionalized PAO product. For example, PAOs of the present disclosure can be functionalized (and optionally hydrogenated) may be used in gear oils, industrial oils, hydraulic oils, compressor oils, or in a driveline or electric vehicle fluid.

III. Hydrogenation

Any of polyalphaolefins produced herein can be hydrogenated. In particular the polyalpha-olefin can be treated to reduce heteroatom containing compounds to less than 600 ppm, and then contacted with hydrogen and a hydrogenation catalyst to produce a polyalpha-olefin having a bromine number less than 1.8. In at least one embodiment, the treated polyalpha-olefin comprises 100 ppm of heteroatom containing compounds or less, preferably 10 ppm of heteroatom containing compounds or less. (A heteroatom containing compound is a compound containing at least one atom other than carbon and hydrogen.) For example, the hydrogenation catalyst can be selected from the group consisting of supported Group 7, 8, 9, and 10 metals, such as the hydrogenation catalyst can be selected from the group consisting of one or more of Ni, Pd, Pt, Co, Rh, Fe, Ru, Os, Cr, Mo, and W, and combination(s) thereof, and/or supported on silica, alumina, clay, titania, zirconia, or mixed metal oxide supports. A hydrogenation catalyst can be nickel supported on kieselguhr, or platinum or palladium supported on alumina, or cobalt-molydenum supported on alumina. Usually, a high nickel content catalyst, such as 60% Ni on Keiselguhr catalyst is used, or a supported catalyst with high amount of Co—Mo loading. Alternately, the hydrogenation catalyst is nickel supported on keisleghur, silica, alumina, clay or silica-alumina.

A polyalpha-olefin is contacted with hydrogen and a hydrogenation catalyst at a temperature from 25 to 350° C., such as 100 to 300° C. In some embodiments, the polyalpha-olefin is contacted with hydrogen and a hydrogenation catalyst for a time period from 5 minutes to 100 hours, such as from 5 minutes to 24 hours. In at least one embodiment, the polyalpha-olefin is contacted with hydrogen and a hydrogenation catalyst at a hydrogen pressure of from 25 psi to 2500 psi, preferably from 100 to 2000 psi. For further information on hydrogenation of PAO's please see U.S. Pat. No. 5,573,657 and "Lubricant Base Oil Hydrogen Refining Processes" (page 119 to 152 of Lubricant Base Oil and Wax Processing, by Avilino Sequeira, Jr., Marcel Dekker, Inc., NY, 1994.

This hydrogenation process can be accomplished in a slurry reactor in a batch operation or in a continuous stirred tank reactor (CSTR), where the catalyst in 0.001 wt % to 20 wt % of the PAO feed or preferably 0.01 to 10 wt %, hydrogen and the polyalpha-olefins are continuously added to the reactor to allow for certain residence time, usually 5 minutes to 10 hours to allow complete hydrogenation of the unsaturated olefins and to allow proper conversion of the mm diads. The amount of catalyst added is usually very small just to compensate for the catalyst deactivation. The catalyst and hydrogenated PAO are continuously withdrawn from the reactor. The product mixture can then be filtered, centrifuged or settled to remove the solid hydrogenation catalyst. The catalyst can be regenerated and reused. The hydrogenated PAO can be used as is or further distilled or fractionated to the right component if necessary. In some cases, when the hydrogenation catalyst show no catalyst deactivation over long term operation, the stir tank hydrogenation process can be carried out in a manner where a fixed amount of catalyst is maintained in the reactor, usually 0.1 wt % to 10% of the total reactant, and only hydrogen and PAO feed are continuously added at certain feed rate and only hydrogenated PAO was withdrawn from the reactor.

The hydrogenation process can also be accomplished by a fixed bed process, in which the solid catalyst is packed inside a tubular reactor and heated to reactor temperature. Hydrogen is and PAO feed can be fed through the reactor simultaneously from the top or bottom or countercurrently to promote the contact between hydrogen, PAO and catalyst and to allow heat management. The feed rate of the PAO and hydrogen are adjusted to give proper residence to allow complete hydrogenation of the unsaturated olefins in the feed and to allow desirable conversion of mm triads in the process. The hydrogenated PAO fluid can be used as is or further distilled or fractionated to give the right component, if necessary. Usually, the finished hydrocarbon PAO fluids have bromine number less than 2 and have reduced amount of mm triads than the unhydrogenated PAO.

III. Apparatus for Producing PAOs

An apparatus useful for producing a hybrid trimer from a PAO dimer is described in U.S. patent application Ser. No. 16/537,364 filed Aug. 9, 2019, which is incorporated herein by reference. In conventional processes and apparatus to produce hybrid trimers, and after generation of the PAO dimer in a first oligomerization reactor, the PAO dimer starting material can be enriched by removing impurities for feed into a second oligomerization reactor. This process, however, involves an additional separation operation to separate dimer from trimer and heavier components because feeding the trimer and higher (tetramer+) oligomers to the second oligomerization reactor produces an undesired heavier product from the second oligomerization reaction. The processes of the present disclosure does not require separating of dimers and heavier components before the second oligomerization and produces a final product with kinematic viscosity at 100° C. from about 3.8 cSt to about 4.3 cSt. Being able to eliminate the separation equipment between these two reactors can dramatically reduce capital spending and simplify plant design and operation.

In an example, the process eliminates the need for a dimer separation stage between a first oligomerization operation and a second oligomerization operation. It has been discovered that the hybrid trimer produced from the process, which includes a first and second oligomerization, meets and/or exceeds conventional process yields of hybrid trimer, even while removing the separation operation between the two oligomerizations. It has been discovered that by using the metallocene dimer selective catalyst, the olefin distribution produced in the first oligomerization reactor (e.g., the metallocene reactor) contains significant amounts of dimer and very small amounts of trimer and higher oligomers (tetramer+). With that distribution, it has also been found that an apparatus for producing hybrid trimers can be designed without separation equipment to remove dimer disposed between the first oligomerization reactor and the second oligomerization reactor (e.g., separation equipment is merely optional) because there is no longer a requirement to separate out the higher molecules. It has been further discovered that an apparatus for producing hybrid trimers can allow for the use of mixed LAO feeds without compromising the quality of the PAO products. Therefore, the processes and configurations described herein can greatly simplify PAO processing while maintaining high yields of desired PAO products, such as low viscosity PAO trimers or "hybrid trimers".

In at least one embodiment, the first oligomerization can utilize the metallocene dimer catalysts and the metallocene dimer selective processes discussed in Section I, and the first oligomerization can form the products discussed in Section I. In at least one embodiment, the second oligomerization can utilize the catalysts and processes for producing PAO trimers (hybrid trimers) discussed in Section II, and can form the products discussed in Section II.

The FIGURE is a diagram illustrating an apparatus for carrying out certain aspects of the present disclosure according to at least one embodiment. More generally, a configuration shown in the FIGURE or similar to the FIGURE can be used for forming poly alpha-olefins of the present disclosure. The FIGURE is a non-limiting example of a configuration. As shown in the FIGURE, an apparatus 100 can include a feed line 102 (LAO feed 1) coupled with a first reactor 104 (e.g., an oligomerization reactor). During use, a feed of the feed line 102 can include an alpha-olefin. The first reactor 104 can be coupled (e.g., directly) with a second reactor 108 (e.g., an oligomerization reactor) via a line 106. A first reactor effluent (e.g., intermediate PAO) of the line 106 can be transferred to the second reactor 108 where the first reactor effluent can undergo a second oligomerization, by, e.g., a $BF_3$-mediated process, to form a second reactor effluent. In some embodiments, a feed line 107 (LAO feed 2) can be coupled to the second reactor 108, such that the feed to the second reactor is a mixture of LAO feed 2 via line 107 and the first reactor effluent via line 106. The second reactor 108 can be coupled to a first distillation unit 112 via a line 110. The second reactor effluent (including the hybrid trimer) can be transferred to the first distillation unit 112 where byproducts and/or contaminants, such as monomer and catalyst components can be separated from the second reactor effluent. The byproducts and/or contaminants may be removed as a first tops fraction via a line 114 and recycled back to second reactor 108 or purged from the process via line 116. In some embodiments, the first tops fraction 114 includes monomer, dimer, and catalyst components and the first distillation effluent of a line 118 includes trimer, tetramer, and higher oligomers. For example, the first distillation effluent 118 is substantially free of dimer. In some embodiments, the first tops fraction includes monomer and catalyst components and the first distillation effluent of a line 118 includes dimer, trimer, tetramer, and higher oligomers. For example, the first tops fraction 114 is substantially free of dimer.

The first distillation unit 112 can be further coupled to a third reactor (e.g., a hydrogenation unit) 120. The first distillation effluent (including PAO trimer) of a line 118 can be transferred to the hydrogenation unit 120. The first distillation effluent may further include dimers, tetramers and higher oligomers (if any). In at least one embodiment, the first distillation effluent is substantially free of dimers. The hydrogenation unit 120 can be coupled to a second distillation unit 124 via a line 122. The hydrogenation effluent can be transferred to the second distillation unit 124 where PAO dimer can be separated from the other components of the hydrogenation effluent such as trimers, tetramers, and higher oligomers (if any). The dimers can be removed as a second tops fraction from the hydrogenation effluent via a line 126.

In at least one embodiment, the line 106 can be free of a separation stage, e.g., any suitable separation device such as one that separates a lighter component from a heavier component, such as a flash drum(s), multiple flash stages in series, atmospheric distillation column(s), vacuum distillation column(s), stripper(s), steam stripper(s), nitrogen stripper(s), membrane separation(s), chromatography column(s), and/or crystallization(s).

In some embodiments, one or more additional apparatus components are disposed between the first reactor and the second reactor. For example, one or more heat exchangers or mixers is disposed between the first reactor and the second reactor.

In at least one embodiment, the hydrogenation effluent 122 or a portion of the hydrogenation effluent 122 can have a KV (100° C.) of from about 3.8 cSt to about 4.3, such as from about 3.9 cSt to about 4.1 cSt and a Noack volatility (y) that does not exceed the value defined by the following equation, where x is the kinematic viscosity at 100° C.:

$$y=-21.0x^2+148.7x-248.9.$$

In at least one embodiment, the second distillation unit effluent 128 or a portion of the second distillation unit effluent 128 can have a KV (100° C.) of from about 3.8 cSt to about 4.3, such as from about 3.9 cSt to about 4.1 cSt, and a Noack volatility (y) that does not exceed the value defined by the following equation, where x is the kinematic viscosity at 100° C.:

$$y=-21.0x^2+148.7x-248.9.$$

In at least one embodiment, the second reactor effluent 110 includes from about 70 wt % to 99 wt % trimer, such as from 75 wt % trimer to 90 wt % trimer, such as from 80 wt % trimer to 85 wt % trimer, such as about 84 wt % trimer.

In at least one embodiment, the first oligomerization can utilize the metallocene dimer catalysts and the metallocene dimer selective processes discussed in Section I, and the first oligomerization can form the products discussed in Section I. In at least one embodiment, the second oligomerization can utilize the catalysts and processes for producing PAO trimers (hybrid trimers) discussed in Section II, and can form the products discussed in Section II.

IV. Additional Embodiments

The present disclosure provides, among others, the following embodiments, each of which may be considered as optionally including any alternate embodiments:

Clause 1. A process to produce a poly alpha-olefin (PAO), the process comprising: introducing a first $C_6$-$C_{32}$ alpha-olefin, a second $C_6$-$C_{32}$ alpha-olefin different than the first $C_6$-$C_{32}$ alpha-olefin, and a first catalyst system comprising an activator and a metallocene compound into a first reactor under reactor conditions, wherein a molar ratio of the first $C_6$-$C_{32}$ alpha-olefin to the second $C_6$-$C_{32}$ alpha-olefin is from about 1:5 to about 5:1, by total moles of the first and second $C_6$-$C_{32}$ alpha-olefin;
  obtaining a first effluent comprising a PAO dimer;
  introducing the first effluent, a third $C_6$-$C_{32}$ alpha-olefin, and a second catalyst system to an oligomerization unit, wherein the third $C_6$-$C_{32}$ alpha-olefin is the same or different than the first $C_6$-$C_{32}$ alpha-olefin and/or second $C_6$-$C_{32}$ alpha-olefin;
  obtaining a second effluent; and
  hydrogenating the second effluent to form the PAO composition.

Clause 2. The process of clause 1, wherein the first $C_6$-$C_{32}$ alpha-olefin comprises decene and the second $C_6$-$C_{32}$ alpha-olefin comprises dodecene.

Clause 3. The process of clauses 1 or 2, wherein the total moles of the first and second $C_6$-$C_{32}$ alpha-olefin comprises less than about 60 mol % decene.

Clause 4. The process of any of clauses 1 to 3, wherein the third $C_6$-$C_{32}$ alpha-olefin comprises octene.

Clause 5. The process of any of clauses 1 to 4, further comprising introducing a fourth $C_6$-$C_{32}$ alpha-olefin to the oligomerizaton unit, wherein the fourth $C_6$-$C_{32}$ alpha-olefin is decene.

Clause 6. The process of any of clauses 1 to 5, further comprising introducing a fourth $C_6$-$C_{32}$ alpha-olefin to the oligomerizaton unit, wherein the fourth $C_6$-$C_{32}$ alpha-olefin is dodecene.

Clause 7. The process of any of clauses 1 to 6, wherein the first effluent is present in an amount of from about 50 wt % to about 90 wt %; the octene is present in an amount of from about 10 wt % to 50 wt %; and a fourth $C_6$-$C_{32}$ alpha-olefin that is decene is present in an amount of less than about 10 wt % decene by total weight of first effluent+octene+fourth $C_6$-$C_{32}$ alpha-olefin, wherein the total amount of first effluent+octene+fourth $C_6$-$C_{32}$ alpha-olefin does not exceed 100%.

Clause 8. The process of any of clauses 1 to 7, wherein the first effluent comprises from about 60 wt % to about 100 wt % PAO dimer.

Clause 9. The process of any of clauses 1 to 8, wherein the PAO dimer comprises greater than about 80 wt % vinylidenes.

Clause 10. The process of any of clauses 1 to 9, wherein the first effluent and the third $C_6$-$C_{32}$ alpha-olefin are present at a molar ratio of PAO dimer to the third $C_6$-$C_{32}$ alpha-olefin of from about 1:2 to about 2:1.

Clause 11. The process of any of clauses 1 to 10, wherein the second effluent comprises about 60 wt % or greater of trimer.

Clause 12. The process of any of clauses 1 to 11, wherein the second effluent comprises about 75 wt % or greater of trimer.

Clause 13. The process of any of clauses 1 to 12, wherein the PAO composition comprises about 70 wt % or greater of trimer.

Clause 14. The process of any of clauses 1 to 13, wherein the PAO composition comprises about 85 wt % or greater of trimer.

Clause 15. The process of any of clauses 1 to 14, wherein the metallocene compound is represented by the formula:

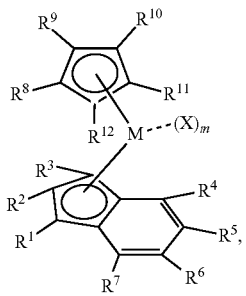

wherein:
each of $R^1$, $R^2$, and $R^3$ is independently hydrogen, a substituted or unsubstituted linear, branched linear, or cyclic $C_1$-$C_{20}$ hydrocarbyl group, wherein at least one of $R^1$, $R^2$, and $R^3$ is not is hydrogen and at least one of $R^1$, $R^2$, and $R^3$ is hydrogen;
each of $R^4$, $R^5$, $R^6$, and $R^7$ is independently hydrogen, a substituted or unsubstituted linear, branched linear, or cyclic $C_1$-$C_{30}$ hydrocarbyl group, or one or more of $R^4$ and $R^5$, $R^5$ and $R^6$, or $R^6$ and $R^7$, taken together with the carbon atoms in the indenyl ring to which they are directly connected, collectively form one or more substituted or unsubstituted rings fused to the indenyl ring;
each of $R^8$, $R^9$, $R^{10}$, $R^{11}$, and $R^{12}$ is independently a substituted or unsubstituted linear, branched linear, or cyclic $C_1$-$C_{30}$ hydrocarbyl, silylcarbyl, or germanyl group;
M is a group 3, 4 or 5 transition metal;
each X is independently a halogen, a hydride, an amide, an alkoxide, a sulfide, a phosphide, a diene, an amine, a phosphine, an ether, or a $C_1$-$C_{20}$ substituted or unsubstituted linear, branched linear, or cyclic hydrocarbyl group, or optionally two or more X moieties may together form a fused ring or ring system; and
m is an integer equal to 1, 2, or 3.

Clause 16. The process of any of clauses 1 to 15, wherein the metallocene compound is represented by the formula:

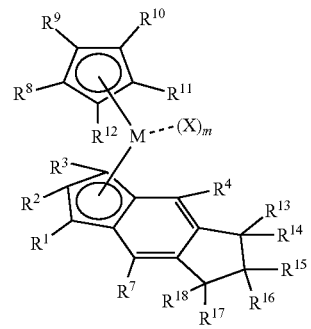

wherein:
each of $R^1$, $R^2$, and $R^3$ is independently hydrogen or a substituted or unsubstituted linear, branched linear, or cyclic $C_1$-$C_{20}$ hydrocarbyl or silylcarbyl group;
each of $R^4$ and $R^7$ is independently a substituted or unsubstituted linear, branched linear, or cyclic $C_1$-$C_{30}$ hydrocarbyl or silylcarbyl group;
each of $R^8$, $R^9$, $R^{10}$, $R^{11}$, and $R^{12}$ is independently a hydrogen, or a substituted or unsubstituted linear, branched linear, or cyclic $C_1$-$C_{20}$ hydrocarbyl, silylcarbyl, or germanyl group, or optionally at least three of $R^8$, $R^9$, $R^{10}$, $R^{11}$ and $R^{12}$ are not hydrogen;
each of $R^{13}$, $R^{14}$, $R^{15}$, $R^{16}$, $R^{17}$, each of $R^{13}$, and $R^{18}$ is independently hydrogen or a substituted or unsubstituted linear, branched linear, or cyclic $C_1$-$C_{20}$ hydrocarbyl or silylcarbyl group;
M is a group 3, 4 or 5 transition metal;
each X is independently a halogen, a hydride, an amide, an alkoxide, a sulfide, a phosphide, a diene, an amine, a phosphine, an ether, or a $C_1$-$C_{20}$ substituted or unsubstituted linear, branched, or cyclic hydrocarbyl group, or optionally two or more X moieties may together form a fused ring or ring system; and
m is an integer equal to 1, 2, or 3.

Clause 17. The process of any of clauses 1 to 16, wherein each of $R^1$, $R^2$, and $R^3$ is independently hydrogen or a substituted or unsubstituted linear, branched linear, or cyclic $C_1$-$C_6$ hydrocarbyl group.

Clause 18. The process of any of clauses 1 to 17, wherein M is Hf.

Clause 19. The process of any of clauses 1 to 18, wherein the second catalyst system comprises a lewis acid catalyst, an alcohol activator, and an alkyl acetate activator.

Clause 20. The process of any of clauses 1 to 19, wherein the second catalyst system comprises:
butanol and butyl acetate in a molar ratio of from about 1:5 to about 7:1, and
boron trifluoride ($BF_3$).

Clause 21. A poly alpha-olefin (PAO) composition comprising:
about 80 wt % or greater of a PAO trimer; and
about 1 wt % to about 15 wt % of a $C_{38+}$ PAO wherein the PAO composition has a kinematic viscosity at 100° C. of from about 3.8 cSt to about 4.3 cSt, according to ASTM D445 and a polydispersisty index of less than about 1.02.

Clause 22. The PAO composition of clause 21, wherein the rotating pressure vessel oxidation test (RPVOT) of the PAO composition, as determined according to ASTM D2272, is from about 90 min to 120 min.

Clause 23. The PAO composition of clause 21 or 22, wherein the PAO composition comprises about 85 wt % or greater of PAO trimer, wherein the trimer comprises $C_{24}$ to $C_{36}$ trimer, wherein an average trimer size of the PAO trimer is C31.

Clause 24. The PAO composition of any of clauses 21 to 23, wherein the PAO composition comprises about 1 wt % to about 10 wt % of the $C_{38+}$ PAO.

Clause 25. The PAO composition of any of clauses 1 to 24, wherein the PAO composition has one or more of the following properties:
- a kinematic viscosity at 40° C. of from about 14 cSt to 20 cSt, according to ASTM D445;
- a kinematic viscosity at −40° C. of from about 2000 cSt to about 2500 cSt, according to ASTM D445;
- a viscosity index of from about 115 to about 155, according to ASTM D2270;
- a Noack volatility of from about 9 wt % to about 12.5 wt %, according to ASTM D5800;
- a pour point of from about −70° C. to about −50° C., according to ASTM D5950;
- an apparent viscosity at −35° C. of from about 1000 cP to about 1400 cP, according to the Cold Cranking Simulator (CCS) method of ASTM D5293; and
- a flash point of from about 210° C. to about 250° C., according to ASTM D93.

V. Characterization

For the characterization, proton NMR ($^1$H-NMR) was used to determine the mol % of the unsaturated species. Specifically, an NMR instrument of 500 MHz is run under the following conditions: a 30° flip angle RF pulse, 8 scans, with a relaxation delay of ~5 s between pulses; sample (60-100 mg) dissolved in $CDCl_3$ (deuterated chloroform) in a 5 mm NMR tube; and signal collection temperature at about 25° C. The following approach is taken in determining the concentrations of the various olefins among all of the olefins from an NMR spectrum. First, peaks corresponding to different types of hydrogen atoms in vinyls (T1), vinylidenes (T2), di-substituted vinylenes (T3), and trisubstituted vinylenes (T4) are identified at the peak regions in Table A. Second, areas of each of the above peaks (A1, A2, A3, and A4, respectively) are then integrated. Third, quantities of each type of olefins (Q1, Q2, Q3, and Q4, respectively) in moles are calculated (as A1/2, A2/2, A3/2, and A4, respectively). Fourth, the total quantity of all olefins (Qt) in moles is calculated as the sum total of all four types (Qt=Q1+Q2+Q3+Q4). Finally, the molar concentrations (C1, C2, C3, and C4, respectively, in mol %) of each type of olefin, on the basis of is the total molar quantity of all of the olefins, is then calculated (in each case, Ci=100*Qi/Qt).

Gas chromatography (GC) was used to determine the composition of the synthesized oligomers by molecular weight. The gas chromatograph is a HP model equipped with a 15 meter dimethyl siloxane and flame ionization detector. A ~0.04 g sample was diluted in methylene chloride solvent, a nonane internal standard was added, and the mixture injected into the column. The starting temperature was about 40° C., held for about 1 minute, program-heated at about 15° C. per minute to about 250° C. and held for about 2 minutes. The sample was then heated at a rate of about 25° C. per minute to about 360° C. and held for about 17.3 minutes. The conversion, olefin isomerization, and oligomer distribution can be determined by the GC method.

VI. Example

An olefin feed was prepared by feeding a 1:1 weight ratio of 97 wt % (as determined by GC) 1-decene to 97 wt % 1-dodecene (as determined by GC) through an adsorbent column filled with alumina adsorbent to a stainless steel Parr vessel and sparged with nitrogen for 1 hour.

A catalyst solution was prepared with 1 g metallocene catalyst, 394 g purified toluene, 1 g TNOA, and 1.6 g N,N-dimethylanilinium tetrakis(pentafluorophenyl)borate (hereinafter referred to as "Activator 1").

The metallocene catalyst used is depicted below.

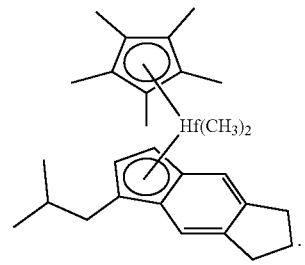

The catalyst solution was mixed in glassware within a glovebox and pumped directly into a 2 gallon stainless steel Parr reactor through stainless steel tubing. The olefin feedstream was added at a rate of about 2,080 grams per hour to the 2 gallon stainless steel Parr reactor held at is about 135° C. for oligomerization. The mixed olefin feed and catalyst solution were fed into the reactor at a ratio of about 66,000 grams of LAO per gram of catalyst. The residence time in the reactor was about 3 hours. The reactor was run at liquid full conditions, with no addition of any gas. When the system reached steady-state, a reactor effluent was collected and quenched by addition of deionized water. A filtration aid (BH-40) was slurried into the reactor effluent at 0.2 wt % in order to react with catalyst remaining in the reactor effluent.

TABLE A

| Type No. | Hydrogen Atoms Olefin Structure | Peak Region (ppm) | Peak Area | Number of Hydrogen Atoms | Quantity of Olefin (mol) | Concentration of Olefin (mol %) |
|---|---|---|---|---|---|---|
| T1 | $CH_2=CH-R^1$ | 4.95-5.10 | A1 | 2 | Q1 = A1/2 | C1 |
| T2 | $CH_2=CR^1R^2$ | 4.65-4.84 | A2 | 2 | Q2 = A2/2 | C2 |
| T3 | $CHR^1=CHR^2$ | 5.31-5.55 | A3 | 2 | Q3 = A3/2 | C3 |
| T4 | $CR^1R^2=CH\ R^3$ | 5.11-5.30 | A4 | 1 | Q4 = A4 | C4 |

The slurry of was then vacuum filtered to remove solids and produce a monomer+oligomer effluent. After vacuum filtration, the monomer+oligomer effluent was evaluated by GC to determine conversion and oligomer distribution. Table 1 shown below, summarizes the monomer+oligomer effluent composition as determined by GC in the row labeled "example monomer+oligomer effluent." The average weight of dimer in the monomer+oligomer effluent of the example was also found to have an average number of carbon atoms of $C_{22}$ to $C_{23}$, as determined by GC. The row labeled "comparative monomer+oligomer effluent" summarizes the composition of the metallocene effluent when the olefin feed was prepared with a single 1-decene olefin feed instead of a 1-decene and 1-dodecene mixture. The average weight of dimer in the monomer+oligomer effluent of the comparative was found to have an average number of carbon atoms of 20, as determined by GC.

TABLE 1

Composition of monomer + oligomer effluent by monomer, dimer, trimer, tetramer+, by weight percentage.

| | Decene | Dodecene | Dimer | Trimer | Tetramer+ |
|---|---|---|---|---|---|
| Comparative monomer + oligomer effluent (100/0) | 16.07 | 0 | 76.37 | 5.59 | 0.57 |
| Example monomer + oligomer effluent (50/50) | 8.48 | 8.77 | 70.2 | 4.395 | 4.419 |

The monomer and lights (e.g. "lights" are molecules with average number of carbon atoms less than or equal to about 12 were removed by vacuum distillation to form an oligomer effluent. The detailed oligomer distribution was determined by GC and shown in Table 2 below. The mole percent of each type of olefin in the distilled intermediate PAO was determined by proton NMR and shown in Table 3 below. There were three different dimers: C20 dimer formed from a combination of C10 reacted with C10, C22 dimer formed from a combination of C10 reacted with C12, and C24 dimer formed from a combination of C12 reacted with C12. Dimers composed of two different LAOs, such as C22 (e.g., reaction of C10 and C12), made up a significant portion of is the stream at 44.53 wt %. A similar phenomena was seen in the trimer region as well. The generation of the C22 molecule in large quantities improves final product properties when compared to generating the C20 and C24 separately and then mixing C20 and C24. By having a large amount of C22 in the dimer mixture, the polydispersity of the oligomer effluent is lowered. An oligomer effluent with low polydispersisty can produce final products after the second oligomerization with low polydispersity. Multiple basestock properties can be negatively impacted by a higher polydispersity, such as Noack volatility, and flash point. The average weight of dimer in the example oligomer effluent had an average number of carbon atoms of $C_{22}$ to $C_{23}$, as determined by GC.

TABLE 2

Composition of example oligomer effluent by carbon number components by weight percent.

| | C20 | C22 | C24 | C26 | C30 | C32 | C34 | C36 |
|---|---|---|---|---|---|---|---|---|
| Example oligomer effluent (50/50) | 25.75 | 44.53 | 20.32 | 0.50 | 1.29 | 1.97 | 1.92 | 0.68 |

TABLE 3

Olefin composition of example oligomer effluent by mole percent.

| Vinylenes | 1 mol % |
|---|---|
| Trisubstituted olefins | 5 mol % |
| Vinyls | 1 mol % |
| Vinylidenes | 93 mol % |

The oligomer effluent generated above was then contacted with an acid catalyst reaction ($BF_3$) in a polymerization unit, along with an additional LAO at a 1:1 molar ratio of oligomer effluent to additional LAO. The feed rate of the components were adjusted such that the feed composition included 70 wt % oligomer effluent, 22 wt % octene, and 8 wt % decene, by total weight of the feed. The feed components were mixed and degassed by pulling a light vacuum in a stirred Parr reactor. The catalyst system used was butanol/butyl acetate in a molar ratio of about 1:1, saturated with $BF_3$ (i.e., $BF_3$ gas was added into the liquid mixture until saturation point). The olefin mixture was added along with the catalyst component (fed at a ratio of about 15 mmol/100 g olefin) and into a series of two 2 L stainless steel Parr reactors. The reactor temperature for both reactors was about 21° C. and held under about 140 kPa (about 20 psia) of $BF_3$ atmosphere. $BF_3$ atmosphere means that the airspace above the liquid in the reactor includes $BF_3$ gas. The residence time of the first reactor was about 1.5 hours and the residence time of the second reactor was about 0.8 hours. The product was collected in a vessel filled with 10% caustic, water washed, and a sample of the oil phase was taken by GC. The resulting distribution of oligomers is shown in Table 4 below.

TABLE 4

Composition of example polymerization effluent

| | Distribution of metallocene reaction |
|---|---|
| Octene wt % | 0.66 |
| Decene wt % | 0.54 |
| Dimer (C16-C25) wt % | 7.1 |
| Trimer (C25-C37) wt % | 83.65 |
| Tetramer+ (C37+) wt % | 8.04 |

The effluent from the polymerization unit was then distilled to remove components up to C24 (e.g., monomer and dimer) in order to meet flash point and volatility standards. This was completed under vacuum in two distinct 22 L glass roundbottoms resulting in two different samples (e.g., sample 1, sample 2) with different product distributions. Both roundbottoms were charged with the distilled effluent, sealed, insulated, and heated under a vacuum of about 5 mmHg until components up to C24 were removed. The resulting compositions of both were detailed by carbon number and are summarized in Table 5. In particular, the average number of carbon atoms in the trimer is about $C_{31}$, as determined by GC, for both distillation products. The polydispersity index (PDI) of the following samples are 1.0092 and 1.0079 respectively. As used herein, PDI is a measure of molecular weight distribution and can be calculated based on carbon numbers measured by GC. Mw and Mn can be calculated using the carbon numbers obtained by GC and based on polymer formulas for each polymer. PDI is Mw divided by Mn.

TABLE 5

Composition of distilled BF3 reactor effluent by carbon number components by weight %.

| | Sample 1 | Sample 2 |
|---|---|---|
| C26 | 0.808 | 0.505 |
| C28 | 17.129 | 15.896 |
| C30 | 38.058 | 38.159 |
| C32 | 25.504 | 26.233 |
| C34 | 7.791 | 7.981 |
| C36 | 2.462 | 2.419 |
| C37+ | 8.230 | 8.557 |

An overall yield of the 4 cST PAO was about 92 wt %, which was calculated by mass balance. The PAO was then hydrogenated to a Bromine number less than 1 in a stainless steel Parr reactor at 232° C., by pumping hydrogen gas until a pressure of 2413 kPa (350 psi) was reached for 2 hours using 0.5 wt % Nickel catalyst in a slurry reactor. The material was vacuum filtered to remove residual catalyst. The physical properties of the example hydrogenated products are summarized in Table 6. A comparative 4 cSt product that uses only 1-decene feed is included also included in Table 6.

TABLE 6

Physical properties of hydrogenated PAO product.

| Test | Method | Unit | Sample 1 | Sample 2 | Comparative |
|---|---|---|---|---|---|
| Kinematic Viscosity @ 100° C. | ASTM D445 | cSt | 3.975 | 4.013 | 4.1 |
| Kinematic Viscosity @ 40° C. | ASTM D445 | cSt | 16.85 | 17.13 | 19 |
| Kinematic Viscosity @ −40° C. | ASTM D445 | cSt | 2190 | 2178 | 2900 |
| Viscosity Index | ASTM D2270 | none | 136 | 136 | 126 |
| Noack Volatility | ASTM D5800 | wt % | 10.7 | 10.57 | 13 |
| Pour Point | ASTM D5950 | ° C. | −63 | −63 | −66 |
| Flash Point | ASTM D93 | ° C. | 233 | 235 | 228 |
| CCS @ −35° C. | ASTM D5293 | cP | 1193 | 1190 | 1450 |
| RPVOT | ASTM D2272 | min | 108 | — | 41 |

The resulting 4 cSt PAO exhibited good oxidative stability while maintaining good low temperature properties. As can be seen in Table 6, low temperature properties (e.g., Kinematic Viscosity @−40° C. and CCS @−35° C.) and Noack volatility properties were improved in the examples when compared with the comparative. The results demonstrated that the two-step process of the present disclosure is able to introduce alternative feeds such as dodecene without is compromising low temperature properties, and in some aspects, improved low temperature properties. Without being bound by theory, it is believed that dimers and trimers produced from dodecene typically exhibit high viscosity at low temperatures. It has been discovered that the process of the present disclosure is able to inhibit at least dodecene trimer production, preserving low temperature performance of the resulting 4 cSt PAO. It has also been found that the hybrid trimer produced from the present disclosure exhibits improved oxidative properties and is believed to have improved traction as a result of the amounts of heavier components that are typically removed in other traditional processes.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element is or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process to produce a poly alpha-olefin (PAO) composition, the process comprising:
   introducing a first $C_6$-$C_{32}$ alpha-olefin, a second $C_6$-$C_{32}$ alpha-olefin different than the first $C_6$-$C_{32}$ alpha-olefin, and a first catalyst system comprising an activator and a metallocene compound into a first reactor under reactor conditions, wherein a molar ratio of the first $C_6$-$C_{32}$ alpha-olefin to the second $C_6$-$C_{32}$ alpha-olefin is from about 1:5 to about 5:1, by total moles of the first and second $C_6$-$C_{32}$ alpha-olefin;
   obtaining a first effluent comprising a PAO dimer;
   introducing the first effluent, a third $C_6$-$C_{32}$ alpha-olefin, and a second catalyst system to an oligomerization unit, wherein the third $C_6$-$C_{32}$ alpha-olefin includes octene;
   obtaining a second effluent; and
   hydrogenating the second effluent to form the PAO composition that is about 85 wt % or greater of a PAO trimer, wherein the PAO trimer comprises $C_{24}$ to $C_{36}$ trimer and an average trimer size of the PAO trimer is $C_{31}$, and about 1 wt % to about 15 wt % of a $C_{38+}$ PAO, and the PAO composition has a kinematic viscosity at 100° C. of from about 3.8 cSt to about 4.3 cSt, according to ASTM D445 and a polydispersity index of about less than about 1.02.

2. The process of claim 1, wherein the first $C_6$-$C_{32}$ alpha-olefin comprises decene and the second $C_6$-$C_{32}$ alpha-olefin comprises dodecene.

3. The process of claim 2, wherein the total moles of the first and second $C_6$-$C_{32}$ alpha-olefin comprises less than about 60 mol % decene.

4. The process of claim 1, wherein the first $C_6$-$C_{32}$ alpha-olefin is decene, the second $C_6$-$C_{32}$ alpha-olefin is dodecene, and the third $C_6$-$C_{32}$ alpha-olefin is octene.

5. The process of claim 1, further comprising introducing a fourth $C_6$-$C_{32}$ alpha-olefin to the oligomerizaton unit, wherein the fourth $C_6$-$C_{32}$ alpha-olefin is decene.

6. The process of claim 1, further comprising introducing a fourth $C_6$-$C_{32}$ alpha-olefin to the oligomerizaton unit, wherein the fourth $C_6$-$C_{32}$ alpha-olefin is dodecene.

7. The process of claim 4, wherein:
the first effluent is present in an amount of from about 50 wt % to about 90 wt %; the octene is present in an amount of from about 10 wt % to 50 wt %; and a fourth $C_6$-$C_{32}$ alpha-olefin that is decene is present in an amount of less than about 10 wt % decene by total weight of first effluent+octene+fourth $C_6$-$C_{32}$ alpha-olefin, wherein the total amount of first effluent+octene+fourth $C_6$-$C_{32}$ alpha-olefin does not exceed 100%.

8. The process of claim 1, wherein the first effluent comprises from about 60 wt % to about 100 wt % PAO dimer.

9. The process of claim 1, wherein the PAO dimer comprises greater than about 80 wt % vinylidenes.

10. The process of claim 1, wherein the first effluent and the third $C_6$-$C_{32}$ alpha-olefin are present at a molar ratio of first effluent to the third $C_6$-$C_{32}$ alpha-olefin of from about 1:2 to about 2:1.

11. The process of claim 1, wherein the second effluent comprises about 60 wt % or greater of trimer.

12. The process of claim 11, wherein the second effluent comprises about 75 wt % or greater of trimer.

13. The process of claim 1, wherein the metallocene compound is represented by the formula:

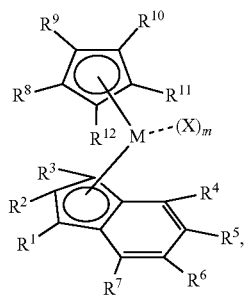

wherein:
each of $R^1$, $R^2$, and $R^3$ is independently hydrogen, a substituted or unsubstituted linear, branched linear, or cyclic $C_1$-$C_{20}$ hydrocarbyl group, wherein at least one of $R^1$, $R^2$, and $R^3$ is not hydrogen and at least one of $R^1$, $R^2$, and $R^3$ is hydrogen;
each of $R^4$, $R^5$, $R^6$, and $R^7$ is independently hydrogen, a substituted or unsubstituted linear, branched linear, or cyclic $C_1$-$C_{30}$ hydrocarbyl group, or one or more of $R^4$ and $R^5$, $R^5$ and $R^6$, or $R^6$ and $R^7$, taken together with the carbon atoms in the indenyl ring to which they are directly connected, collectively form one or more substituted or unsubstituted rings fused to the indenyl ring;
each of $R^8$, $R^9$, $R^{10}$, $R^{11}$, and $R^{12}$ is independently a substituted or unsubstituted linear, branched linear, or cyclic $C_1$-$C_{30}$ hydrocarbyl, silylcarbyl, or germanyl group;
M is a group 3, 4 or 5 transition metal;
each X is independently a halogen, a hydride, an amide, an alkoxide, a sulfide, a phosphide, a diene, an amine, a phosphine, an ether, or a $C_1$-$C_{20}$ substituted or unsubstituted linear, branched linear, or cyclic hydrocarbyl group, or optionally two or more X moieties may together form a fused ring or ring system; and
m is an integer equal to 1, 2, or 3.

14. The process of claim 13, wherein the metallocene compound is represented by the formula:

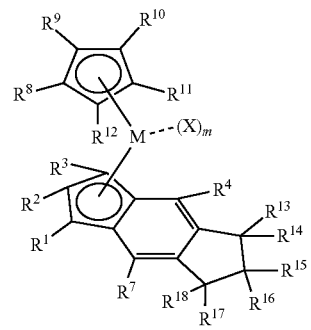

wherein:
each of $R^1$, $R^2$, and $R^3$ is independently hydrogen or a substituted or unsubstituted linear, branched linear, or cyclic $C_1$-$C_{20}$ hydrocarbyl or silylcarbyl group;
each of $R^4$ and $R^7$ is independently a substituted or unsubstituted linear, branched linear, or cyclic $C_1$-$C_{30}$ hydrocarbyl or silylcarbyl group;
each of $R^8$, $R^9$, $R^{10}$, $R^{11}$, and $R^{12}$ is independently a hydrogen, or a substituted or unsubstituted linear, branched linear, or cyclic $C_1$-$C_{20}$ hydrocarbyl, silylcarbyl, or germanyl group, or optionally at least three of $R^8$, $R^9$, $R^{10}$, $R^{11}$, and $R^{12}$ are not hydrogen;
each of $R^{13}$, $R^{14}$, $R^{15}$, $R^{16}$, $R^{17}$, and $R^{18}$ is independently hydrogen or a substituted or unsubstituted linear, branched linear, or cyclic $C_1$-$C_{20}$ hydrocarbyl or silylcarbyl group;
M is a group 3, 4 or 5 transition metal;
each X is independently a halogen, a hydride, an amide, an alkoxide, a sulfide, a phosphide, a diene, an amine, a phosphine, an ether, or a $C_1$-$C_{20}$ substituted or unsubstituted linear, branched, or cyclic hydrocarbyl group, or optionally two or more X moieties may together form a fused ring or ring system; and
m is an integer equal to 1, 2, or 3.

15. The process of claim 13, wherein each of $R^1$, $R^2$, and $R^3$ is independently hydrogen or a substituted or unsubstituted linear, branched linear, or cyclic $C_1$-$C_6$ hydrocarbyl group.

16. The process of claim 13, wherein M is Hf.

17. The process of claim 1, wherein the second catalyst system comprises a Lewis acid catalyst, an alcohol activator, and an alkyl acetate activator.

18. The process of claim 1, wherein the second catalyst system comprises:
- butanol and butyl acetate in a molar ratio of from about 1:5 to about 7:1, and
- boron trifluoride ($BF_3$).

19. A poly alpha-olefin (PAO) composition comprising:
- about 85 wt % or greater of a PAO trimer, wherein the PAO trimer comprises $C_{24}$ to $C_{36}$ trimer and an average trimer size of the PAO trimer is $C_{31}$; and
- about 1 wt % to about 15 wt % of a $C_{38+}$ PAO wherein the PAO composition has a kinematic viscosity at 100° C. of from about 3.8 cSt to about 4.3 cSt, according to ASTM D445 and a polydispersity index of about less than about 1.02.

20. The PAO composition of claim 19, wherein the rotating pressure vessel oxidation test (RPVOT) of the PAO composition, as determined according to ASTM D2272, is from about 90 min to 120 min.

21. The PAO composition of claim 19, wherein the PAO composition comprises about 1 wt % to about 10 wt % of the $C_{38+}$ PAO.

22. The PAO composition of claim 19, wherein the PAO composition has one or more of the following properties:
- a kinematic viscosity at 40° C. of from about 14 cSt to 20 cSt, according to ASTM D445;
- a kinematic viscosity at −40° C. of from about 2000 cSt to about 2500 cSt, according to ASTM D445;
- a viscosity index of from about 115 to about 155, according to ASTM D2270;
- a Noack volatility of from about 9 wt % to about 12.5 wt %, according to ASTM D5800;
- a pour point of from about −70° C. to about −50° C., according to ASTM D5950;
- an apparent viscosity at −35° C. of from about 1000 cP to about 1400 cP, according to the Cold Cranking Simulator (CCS) method of ASTM D5293; and
- a flash point of from about 210° C. to about 250° C., according to ASTM D93.

* * * * *